United States Patent [19]
Meister et al.

[11] Patent Number: 5,484,895
[45] Date of Patent: * Jan. 16, 1996

[54] GRAFT COPOLYMERS OF VASCULAR PLANTS, METHOD OF MAKING SAME AND USES THEREFORE

[76] Inventors: John J. Meister, 31675 Westlady Dr., Beverly Hills, Mich. 48025-3744; Meng-Jiu Chen, 17418 Warrington, Detroit, Mich. 48221

[*] Notice: The portion of the term of this patent subsequent to Aug. 11, 2009, has been disclaimed.

[21] Appl. No.: 44,944

[22] Filed: Apr. 8, 1993

Related U.S. Application Data

[63] Continuation-in-part of Ser. No. 601,442, Oct. 22, 1990, abandoned, which is a continuation-in-part of Ser. No. 286,534, Dec. 19, 1988, Pat. No. 4,940,764, and Ser. No. 479,839, Feb. 14, 1990, Pat. No. 5,138,007, which is a continuation-in-part of Ser. No. 286,344, Dec. 19, 1988, Pat. No. 4,931,527.

[51] Int. Cl.$^6$ ............................. C07G 1/00; C08L 97/00
[52] U.S. Cl. ........................ 530/500; 527/400; 527/401
[58] Field of Search ..................................... 527/400, 401; 530/500

[56] References Cited

U.S. PATENT DOCUMENTS

| | | |
|---|---|---|
| 4,687,828 | 8/1987 | Meister et al. |
| 5,138,007 | 8/1992 | Meister ................................ 527/400 |

Primary Examiner—Paul R. Michl
Assistant Examiner—Duc Truong
Attorney, Agent, or Firm—Barnes, Kisselle, Raisch, Choate, Whittemore & Hulbert

[57] ABSTRACT

A graft copolymer of a vascular plant having a biologically produced part that is the plant or a component thereof and at least one sidechain, Sc, having randomly repeat unit, $R_{ru}$, wherein $R_{ru}$ are formed by the polymerization of at least one substituted ethene polymerable by free radical polymerization. The sidechain repeat unit, $R^{ru}$, has the structure

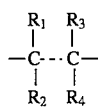

such that the side groups, $R_i$ where i=1 to 4, on the sidechain are selected from the group of alkanes, alkenes, amides, alcohols, alkoxides, aromatics, cycloalkanes, esters, halogens, hydrogen, phenols, and nitrile groups and such groups further substituted with one or more groups. The side groups on the sidechain may vary from one repeat unit to another. The number of sidechains on the woody plant fragment can vary from 1 to 500 and the number of repeat units in each sidechain can vary from 1 to 500,000. The invention provides a vascular plant or component thereof, chemically bound to a polymerized chain of repeat units from ethene monomers which possess the desirable properties of a thermoplastic, the desirable properties of a macromolecular surfactant, the desirable properties of a thermoplastic which degrades completely in the environment, the desirable properties of a controlled release agent, and the desirable features of a wood-reinforced, thermoplastic composite.

19 Claims, 9 Drawing Sheets

GRAFT COPOLYMERS OF VASCULAR PLANTS, METHOD OF MAKING SAME AND USES THEREFORE

REFERENCE TO CO-PENDING APPLICATION

This application is a continuation-in-part of PCT/US91/07636 filed Oct. 16, 1991, which is a continuation-in-part of U.S. Ser. No. 07/601,442, filed Oct. 22, 1990, now abandoned both of which were co-pending with and are continuation-in-part applications of U.S. Ser. No. 07/479,839 filed on Feb. 14, 1990, and issued as U.S. Pat. No. 5,138,007 on Aug. 11, 1992, which is a continuation-in-part of copending U.S. patent application Ser. No. 07/286,344 filed on Dec. 19, 1988 issued as U.S. Pat. No. 4,931,527 on Jun. 5, 1990; and U.S. Ser. No. 07/286,534 also filed on Dec. 19, 1988, issued as U.S. Pat. No. 4,940,764 on Jul. 10, 1990.

FIELD OF THE INVENTION

The present invention relates to graff copolymers of vascular plants, methods of making the same, and uses therefore.

BACKGROUND OF THE INVENTION

Thermoset and thermoplastic materials have provided significant performance advantages because of their relatively high strength compared to weight. This allows thermoplastic materials to be used in devices ranging from consumer items to complex industrial equipment. Pure thermosets and thermoplastics have a homogeneous internal composition and have minimal or no activity at a surface or phase boundary. The materials are also prone to "creep" as an applied load or the solid's own weight cause the solid to deform with time. Attempting to form a composite by mixing a vascular plant part and a plastic made from an ethane monomer produces a material in which the two components clump into large, separate phases to produce a weakened, unstructured solid with no surface activity, no wetting of woody interfaces, decreased binding strength even in the two phase solid, and degradation of the plant phase alone under attack by microorganisms.

SUMMARY OF THE INVENTION

The invention provides new compositions of matter in which a vascular plant, its pans, or its structural constituents are converted into thermoplastics, surface active agents, and composites. The material is a thermoplastic if lignin is used as the backbone. This is a hard, strong, thermoplastic that can be molded, cast, and extruded into parts, equipment, and consumer items; occupies interfaces between a woody phase and a plastic phase; couples these phases together to increase binding strength; has both backbone and sidechain degrade under attack by microorganisms; forms structured heterogeneous solids; forms insulating degradable foams when blown into a porous cellular foam; and can release groups attached to backbone or sidechain as degradation fragments useful as medications, reagents or initiators in controlled release processes. The material is a wood-reinforced, hydrophobic composite with limited creep, increased tensile strength compared to the plastic made from the ethene monomer, firm binding between wood arid plastic and thermoplastic flow properties if the backbone is any part of a vascular plant or grass.

The invention comprises a grafted part of a vascular plant or its structural constituents as well as grafted products thereof. A vascular plant is any of the shrubs, trees, herbs, grasses, ferns, or flowers that make up the flora. The structural constituents of a vascular plant are the three polymers that plants use to construct themselves. These structural constituents are any mixtures of cellulose, hemicellulose, and lignin that contain at least 0.01 weight percent lignin. These structural constituents may be blended together in a mixture or they may be chemically linked to one another up to and including the point where the connected compounds become part or all of a vascular plant. Grafted to this central plant part network is at least one grafted sidechain having randomly repeating units $R_{ru}$ wherein $R_{ru}$ is formed by the polymerization of at least one substituted ethene by free radical polymerization, and the side groups on $R_{ru}$, $R_i$ where i=1 to 4, are selected from the group of acids, alcohols, alkanes, alkenes, alkoxides, amides, aromatics, cycloalkanes, esters, halogens, hydrogen, nitrile, and phenol groups and such groups further substituted with one or more groups.

The invention provides a vascular plant or its structural constituents chemically bound to a polymerized chain of repeat units from ethene monomers which possess the desirable properties of a thermoplastic: strength, impact resistance, and deformability at higher temperature; the desirable properties of a macromolecular surfactant: populating interfaces, wetting wood until it is hydrophobic, and forming internally structured solids; the desirable proparties of a thermoplastic which degrades completely in the environment; the desirable properties of a controlled release agent: emission of pharmaceuticals, reagents and initiators as degradation fragments over time; and the desirable features of a wood-reinforced, thermoplastic composite: reduced creep, increased strength, and capacity to deform and shape with heat.

In a preferred embodiment, the invention provides a substance produced from all, part, or a mixture of the structural constituents of a vascular plant. Vascular plants, are the members of the plant kingdom with an internal organization of tubes, xylem and phloem channels, made out of three types of cells, parenchyma, collenchyma, or sclerenchyma cells. A part of the plant is any contiguous piece of a root, shoot, or leaf of the plant. A mixture of the structural constituents of the plant contains hemicellulose, and lignin, possibly contaminated with the inert "mineral" portion of the plant: starch, lipid, silica bodies, silica stegmata, protein bodies, and mucilage.

The vascular plant, its part, or a mixture of the plant's structural constituents has a cellulose content of 0 to 99.9 weight percent, a hemicellulose content of 0 to 90 percent, a lignin content of 0.01 to 100 weight percent, and a mineral content of 0 to 60 weight percent. These chemically distinct parts of the vascular plant may be bound into the naturally-occurring structures of a vascular plant; bark; phloem; xylem; or cambium; parenchyma, collenchyma, or sclerenchyma cells; or can be mixtures of cellulose, hemicellulose, lignin, and minerals, chemically distinct molecules that can be separated from the vascular plant. All vascular plants contain polymeric, alkylaromatic compounds made from coumaryl, coniferyl, and synapyl alcohol. Attached to these polymeric, alkylaromatic compounds in the plant fragment by carbon-carbon bond is at least one sidechain, Sc, having randomly repeating units, $R_{ru}$, wherein $R_{ru}$ are formed by the polymerization of at least one substituted ethene polymerizable by free radical polymerization. The sidechain repeat unit, $R_{ru}$, has the structure

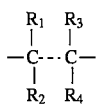

such that the side groups, $R_i$ where i=1 to 4, on the sidechain are selected from the group of alkanes, alkenes, amides, alcohols, alkoxides, aromatics, cycloalkanes, esters, halogens, hydrogen, phenols, and nitrile groups and such groups further substituted with one or more groups. The side groups on the sidechain may vary from one repeat unit to another. The number of sidechains on the woody plant fragment can vary from 1 to 500 and the number of repeat units in each sidechain can vary from 1 to 500,000.

The present invention also provides a process for making a grafted copolymer of a vascular plant at high yield which possesses the desirable properties of a thermoplastic, wetting agent, coupling agent, composite, microdomain solid, and compostable plastic.

This new method circumvents the synthesis failures which are encountered when 2-propenamide is replaced by a substituted ethene with a different dipole moment and sharply reduced water-solubility. To react ethane monomers with dipole moments below 1.2 or above 1.8 and water solubilities of less than 5.0 g of monomer per 100 g of water at 30° C. with a vascular plant part to produce grafted product requires continuous stirring during the reaction, preferably at a controlled stirring rate. The method thus allows synthesis of materials impossible to prepare by known methods.

The deficiencies of prior methods are overcome by the invention using the thermoset or thermoplastic materials made from two components, a backbone and sidechain. A molecular backbone grafted with a sidechain has now been shown to make a surface active agent which can form heterogeneous solids and populate an interface. Vascular plants are composites themselves with their structure formed by bonds between aggregates of different molecules. This composite backbone, grafted with a thermoplastic sidechain, has now been shown to create a fiber-reinforced, thermoplastic composite. Such composites are only possible by the method of the invention which chemically connects backbone and sidechain, a particularly difficult process if the backbone is an inconsistent and varied material like vascular plants, wood, and lignin.

BRIEF DESCRIPTION OF THE DRAWINGS

FIG. 6A is the effect of G. trabeum, FIG. 6B is the effect of P. ostreatus, FIG. 6C is the effect of P. chrysosporium, FIG. 6D is the effect of T. versicolor, and LPS stands for lignin polystyrene copolymers and the numbers 10, 32, and 50 designate the percent lignin in the blend.

DETAILED DESCRIPTION OF THE PREFERRED EMBODIMENT

Figure 1:
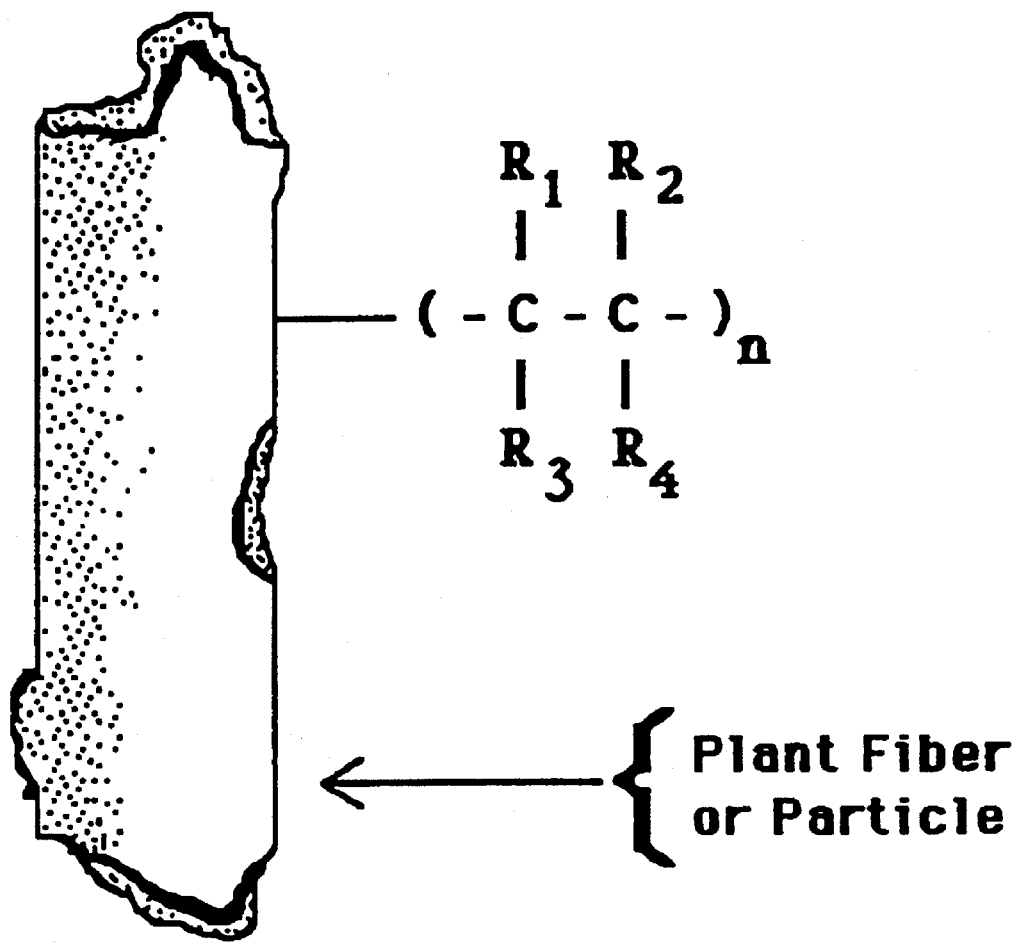
FIG. 1 is an image of a part of a vascular plant that has been grafted by the method of the present invention.

In accordance with the present invention, there is provided a high molecular weight grafted material. The invention comprises a grafted vascular plant, plant part, or structural constituent mixture which is at least one of the group listed in Table 2B, the grafted portion having at least 0.01 weight percent lignin, a cellulose content of 0 to 99.9 weight percent, a hemicellulose content of 0 to 90 weight percent, and a combined starch, lipid, crystal, silica bodies, silica stegmata, protein bodies, and mucilage content of 0 to 60 weight percent, such that to this central plant part network is grafted at least one sidechain having randomly repeating units $R_{ru}$ wherein $R_{ru}$ is formed by the polymerization of at least one substituted ethene by free radical polymerization, and the side groups on $R_{ru}$, $R_i$ where i=1 to 4, are selected from the group of acids, alcohols, alkanes, alkenes, alkoxides, amides, aromatics, cycloalkanes, esters, halogens, hydrogen, nitrile, and phenol groups and such groups further substituted with one or more groups.

The invention provides a lignin, grass, bark, leaf, twig, root, seed, wood, wood fiber, or wood pulp, chemically bound to a polymerized chain of repeat units from ethene monomers which possess the desirable properties of a thermoplastic: strength, impact resistance, and deformability at higher temperature; the desirable properties of a macromolecular surfactant: populating interfaces, wetting wood until it is hydrophobic, and forming internally structured solids; the desirable properties of a thermoplastic which degrades completely in the environment; the desirable properties of a controlled release agent: emission of pharmaceuticals, reagents and initiators as degradation fragments over time; and the desirable features of a wood-reinforced, thermoplastic composite: reduced creep, increased strength, and capacity to deform and shape with heat.

In a preferred embodiment, the invention provides a substance produced from all, part, or a mixture of the structural chemicals, of a vascular plant. The vascular plant or a part of it can be wood; wood pulp; wood fiber; wood filament; wood veneer; xylem; bark; twigs; roots; shoots; leaves; seeds; phloem; cambium; parenchyma, collenchyma, or sclerenchyma cells; lignin; or structured plant parts from any grass, softwood, or hardwood. The mixture of the structural chemicals of the plant can be cellulose, hemicellulose, and lignin, contaminated with minerals: starch, lipid, crystal, silica bodies, silica stegmata, protein bodies, and mucilage.

The vascular plant, its part, or a mixture of the plant's structural constituents has a cellulose content of 0 to 99.9 weight percent, a hemicellulose content of 0 to 90 percent, a lignin content of 0.01 to 100 weight percent, and a mineral content of 0 to 0 weight percent. These chemically distinct parts of the vascular plant may be bound into the naturally-occurring structures of a vascular plant; bark; phloem; xylem; cambium; or parenchyma, collenchyma, or sclerenchyma cells; or can be mixtures of cellulose, hemicellulose, lignin, and minerals, chemically distinct molecules that can be separated from the vascular plant. Attached to polymede, alkylaromatic compounds in the plant fragment by carbon-carbon bond is at least one sidechain, Sc, having randomly repeating units, $R_{ru}$, wherein the sidechain repeat unit, $R_{ru}$, has the structure

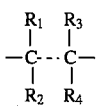

such that the side groups, $R_i$ where i=1 to 4, on the sidechain are selected from the group of alkanes, alkenes, amides, alcohols, alkoxides, aromatics, cycloalkanes, esters, halogens, hydrogen, phenols, and nitrile groups and such groups further substituted with one or more groups. In one preferred embodiment of the invention, these side groups, when detached from the backbone by environmental degradation, become pharmaceuticals, reagents or initiators. The side groups on the sidechain may vary from one repeat unit to another and when they do the sidechain is a random copolymer. Common monomers represented by this structure are: 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-butadiene; 2-propene nitrile; 1,1-dichloroethene; N,N-bis(2-propenamido)methane; 1-methyl-1-phenylethene; 2-chloro-1,3-butadiene; 2-oxo-3-oxypent- 4-ene; 2-oxy-3-oxopent-4-ene; 4-methyl-2-oxy-3-oxopent-4-ene; propene; or ethene. The number of sidechains on the woody plant fragment can vary from 1 to 500 and the number of repeat units in each sidechain can vary from 1 to 500,000. For example, when using a vascular plant or plant part in accordance with the present invention, a graft product of the formula of FIG. 1 is produced.

Figure 2:
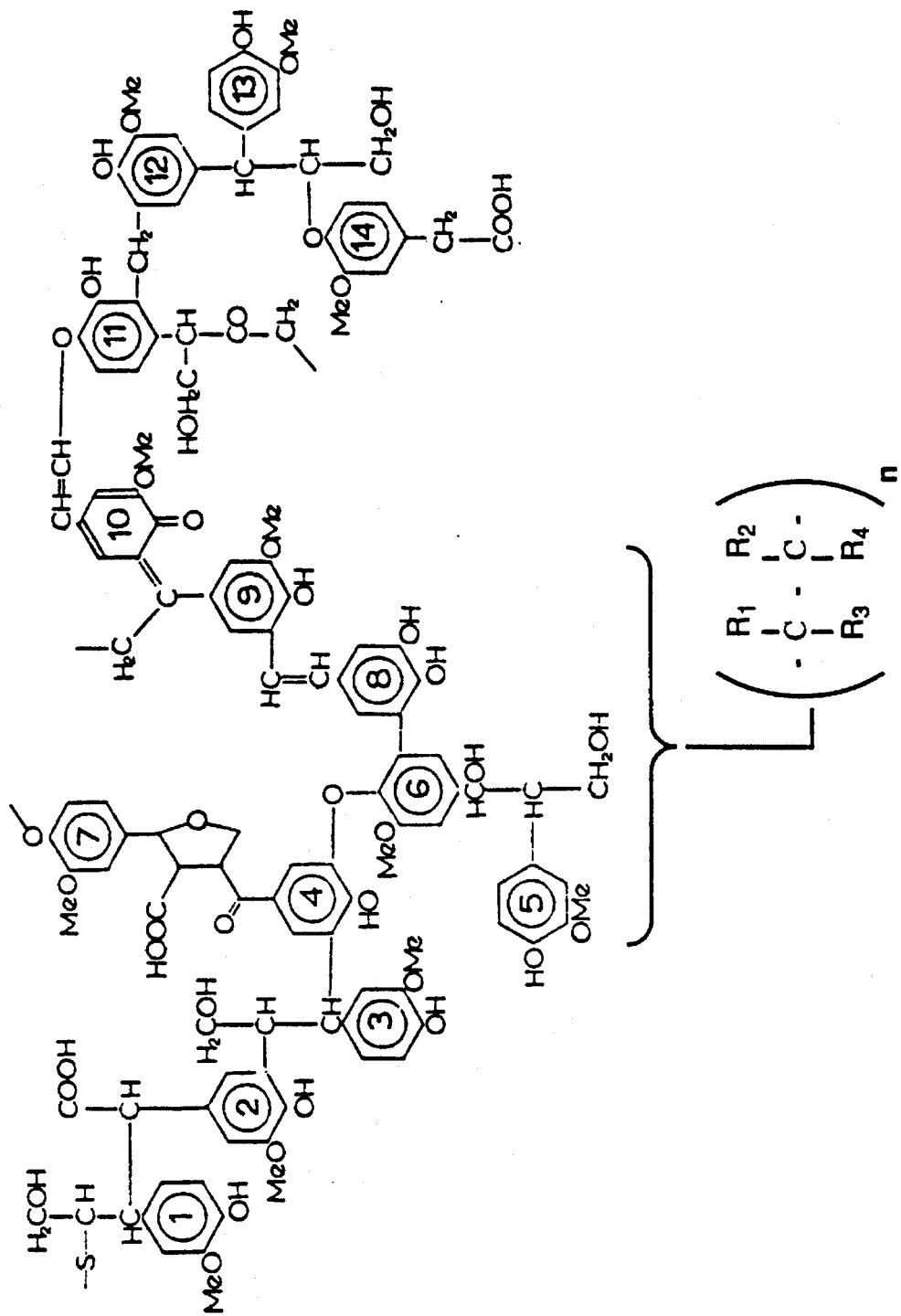
FIG. 2 is an image of a structural constituent of a vascular plant that has been grafted by the method of the present invention.

When using a mixture of plant compounds in accordance with the present invention, a graff product of the formula of FIG. 2 is produced.

The present invention also provides a process for making a grafted vascular plant, plant part, or structural chemical mixture at high yield which possesses the desirable properties of a thermoplastic, wetting agent, coupling agent, composite, microdomain solid, and compostable plastic.

This new method circumvents the synthesis failures which are encountered when polar, water-soluble monomers are replaced by another substituted ethene with a different dipole moment and sharply reduced water solubility. To react ethene monomers with dipole moments below 1.2 or above 1.8 and water solubilities of less than 5.0 g of monomer per 100 g of water at 30° C. with a vascular plant part to produce grafted product requires continuous stirring during the reaction, preferably at a controlled stirring rate. Such stirring is critical and in the absence of stirring, a grafted product simply cannot be produced.

The classification of Kingdom Plantae in biology is stable and universally accepted. The nomenclature of Bold, Alexopoulos, and Delovoryas; H. C. Bold, C. J. Alexopoulos, T. Delevoryas, *Morphology of Plants and Fungi*, 1980, Harper and Row, New York; will be used to identify vascular plants, the Tracheophytes, as those that have vascular tissues specialized for conduction of water. This group of plants includes vascular cryptogams; divisions Psilotophyta, Microphyliophyta, Arthrophyta, and Pterophyta; and seed plants, the Spermatophytes; divisions Trimerophytophyta, Progymnospermophyta, Cycadophyta, Coniferophyta, Anthophyta, Ginkgophyta, and Gnetophyta. The seed plants developed the "modern" structures: wood, bark, and seeds. Viewed by their external organization, vascular plants consist of three parts: root, shoot, and leaf. Viewed by their internal structure, vascular plants consist of three fundamental types of cells: Parenchyma, with thin walls; Collenchyma, with irregularly thickened walls; and Sclerenchyma, with very thick, strong walls. The body of the plant is covered with an epidermis, often containing glands, hairs, and stomata. Interior to this is the cortex, the bulk of which is made up of parenchyma cells. Inside the cortex is the stele, vascular tissues consisting of xylem or phloem structures. Portions of this invention show how the new thermoplastic coupling agents can be applied to wood, wood pulp, or wood fiber. Wood is defined as the hard fibrous substance, basically xylem, that makes up the greater part of the stems and branches of trees or shrubs. It is found beneath the bark and is also found to a limited extent in herbaceous plants.

Chemically, the plant and its parts are made up of starch; lipid; druses, raphides, and styloids crystals; silica bodies and stegmata; protein bodies; mucilages; cellulose; hemicellulose; and lignin. These structures and molecules are described in *Plant Anatomy*, James D. Mauseth, 1988, Benjamin Cumming's Publishing, Menlo Park, Calif., ISBN 0-8053-4570-1. These chemically distinguishable plant compounds exist both as mixtures and as chemically bound, larger molecules within the plant or its parts. The materials can be grafted as an aggregate in a plant or its parts or as mixtures of the separate structural plant compounds blended together.

Lignin [8068-00-6] is derived from woody plants. Common subclasses of lignin are: chlorinated lignin, [8068-02-8]; 1,n-dioxacyclohexane acidolysis lignin, [8068-03-9]; Holmberg lignin, [8068-07-3]; hydrochloric acid lignin, [8068-11- 9]; kraft lignin, [8068-05-1] or [8068-06-2]; soda lignin, [8068-05-1] or [8068-01-7]; sulfite lignin, [8062-15-5]; and sulfuric acid lignin, [8068-04-0]. Lignins are produced by all vascular plants from coumaryl, coniferyl, and sinapyl alcohol.

The preparation of this copolymer is accomplished, in general, under oxygen-free conditions by adding a redox initiator; a halide salt, chloride salt preferred; and an ethene monomer to a vascular plant, plant part, or mixture of structural plant constituents dispersed in a suitable solvent and allowing time for graft polymerization to occur.

Example A

This example, Example A, provides the basic, non-quantitative method. Significant variation in reaction mixture composition and preparation procedure are possible as will be illustrated in subsequent examples which follow Example A.

The basic method for the preparation of a graff copolymer of a vascular plant, plant part, or mixture of plant compounds in dimethylsulfoxide, 1,4-dioxacyclohexane, or dimethyl formamide for a sample composed of between 0.1 and 35 weight percent plant material; 0.1 and 40.0 weight percent ethene monomer; 0.3 to 15.3 weight percent metal halide salt, chloride salt preferred; and 25 to 97 weight percent solvent; are presented here.

The method generally comprises:

a) An aliquot of one-half to all of the purified solvent is placed in a sealable reaction vessel. Some suitable solvents for the reaction are listed in Table 1.

b) Finely ground anhydrous halide salt, chloride salt preferred, are added to the solvent. Typical salts are listed in Table 2A.

c) The vascular plant, plant part, or mixture of plant compounds is added to the solvent and the mixture is agitated to disperse the plant component. Typical vascular plant parts are listed in Table 2B. In a process to react large parts of the plant, such as 2 to 3 meter wide veneer sheets, the introduction of the large plant part will usually be delayed until after step f. The plant part will then be run through or bathed in the reaction mixture of step f within an oxygen-free zone.

d) The mixture is stirred for about 20 minutes to dissolve the solids while being bubbled with nitrogen.

e) After 10 minutes of nitrogen saturation, a hydroperoxide such as hydrogen peroxide or 2-hydroperoxy-1,4-dioxacyclohexane is added to the reaction mixture. A selection of suitable hydroperoxides for the graft copolymerization are shown in Table 3.

f) An ethene monomer polymerizable by free radical reaction is added to the reaction vessel under a gas blanket inert to free radical reactions. The monomer may be in gaseous, liquid, or solid form but should be saturated with and maintained under the inert atmosphere. Preferred methods are to add the monomer as a nitrogen-saturated solid or nitrogen-saturated liquid. The most preferred method for this disclosure is to add a nitrogen-saturated solution of monomer in the remaining fraction of the solvent not added in step (a).

g) After about 10 minutes, the flask is sealed under nitrogen, and the slurry is stirred for 10 more minutes.

h) The reaction flask is placed in a 30° C. bath and is continuously stirred for two days. The rate of stirring depends upon the amount of monomer in the mixture and the shape and structure of the reaction vessel. The duration of the reaction can be readily varied. The flask contents will often thicken slowly but may even solidify into a precipitate-laden, viscous slurry.

i) The reaction is then terminated by addition of 1 weight percent of hydroquinone in water or exposure to air.

j) The reaction mixture is dipped into a volume of water equal to about 10 times the volume of the reaction and stirred until a uniform reaction product is precipitated. If the plant material used in the reaction is a mixture of plant compounds, the water used in this precipitation step is acidified to pH=2 by addition of HCl.

k) The solid is recovered by filtration and dried under vacuum at 30° C.

Organic liquids are a suitable solvent for the graft copolymerization and preferably an organic polar, aprotic solvent, such as a solvent from Table 1, is used. Mixtures of these solvents in various proportions can also be used such as 50/50 (vol/vol) mixtures of DMSO and 1,4-dioxacyclohexane; and a 50/50 (vol/vol) mixture of DMSO with water.

TABLE 1

Liquids Used in Solution Polymerization of Graft Copolymers

| | |
|---|---|
| Dimethylsulfoxide (DMSO)[a] | Dimethylacetamide |
| 1,4-Dioxacyclohexane | Dimethyl formamide |
| Water | 1-Methyl-2-pyrrolidinone |
| Pyridine | |

[a]Most frequently used liquids given in bold print.

TABLE 2

Lignins Grafted with this Chemistry and Salts Used

A. SALTS

| Name | Formula | Name | Formula |
|---|---|---|---|
| Calcium Chloride | $CaCl_2$ | Sodium Bromide | NaBr |
| Sodium Chloride | NaCl | Lithium Bromide | LiBr |
| Potassium Chloride | KCl | Calcium Fluoride | $CaF_2$ |
| Magnesium Chloride | $MgCl_2$ | Potassium Bromide | KBr |
| Lithium Chloride | LiCl | Magnesium Fluoride | $MgF_2$ |
| Calcium Bromide | $CaBr_2$ | Sodium Fluoride | NaF |
| Magnesium Bromide | $MgBr_2$ | Potassium Fluoride | KF |
| Lithium Fluoride | LiF | | |

B. VASCULAR PLANT, PLANT PART, OR MIXTURE OF PLANT COMPOUNDS

Source

| | | | |
|---|---|---|---|
| Pine | Aspen | Yellow Poplar | Maple |
| Oak | Bagasse | Bamboo | Spruce |
| Birch | Blank Locust | Walnut | Corn |
| Beech | Cotton Flower (*Gossypium hirsutum*) | | Primrose (*Primula vulgaris*) |

Plant Part

| | | | |
|---|---|---|---|
| Roots Shoots | Leaves | Seeds | |
| Bark | Twigs | Wood | Wood Pulp |
| Wood fiber | Wood Filament | Wood Veneer | Xylem |
| Phloem | Cambium | Parenchyma Cells | Cellenchyma Cells |
| Selerenchyma Cells | | | |

Mixtures of Lignin and Cellulose, Hemicellulose, or Plant-Produced, Inorganic Minerals.

The choice of vascular plant, plant part, or mixture of plant compounds is apparently general. That is, a whole series of vascular plants obtained by different techniques have been grafted by this method, as shown by the data of Table 2B.

In general, these vascular plant parts were dried before being used. Some materials were extracted with benzene at 78° C. for 48 hours to allow separation tests on the reaction products but these extractions are extraneous to the synthesis method and product properties. The plant parts come in many forms, varying from boards to mixture of the powdered plant compounds listed in Table 2B. Note that the materials listed in Table 2B cover grasses, softwoods, and hardwoods. Further, all forms and parts of the plant can be grafted.

TABLE 3

Hydroperoxides Useful in Polymerization of Graft Copolymers

| | |
|---|---|
| hydrogen peroxide | 2-hydroperoxy-1,4-dioxacyclohexane |
| 3,3-dimethyl-1,2-dioxybutane | |

Anhydrous Solid Peroxides

| | |
|---|---|
| sodium peroxyborate | magnesium peroxyphthalate |
| sodium percarbonate | |

The hydroperoxide addition can be made by adding an aqueous solution of the peroxide for safe handling or the peroxide can be added directly.

Yield is calculated from the formula:

$$\text{weight percent yield} = \frac{\text{(g polymer recovered)}}{\text{g plant part added} + \text{g monomer added}} \quad (1)$$

where g = grams.

It is preferred that all reagents used be of reagent grade purity but less pure materials may be used if they do not contain inhibitors for the reaction. Other changes in this procedure, evident to those skilled in synthesis or chemical manufacture, can be made.

The reaction is allowed to proceed for 1 to 200 hours, with 48 hours being a typical reaction time. It is common to terminate the copolymerization by addition of a free radical scavenger such as hydroquinone. In the examples, parts and percentages are by weight and temperatures are in centigrade unless otherwise indicated.

Indulin AT, a commercial lignin product of the Westvaco Corporation was used in some syntheses. Yellow poplar lignin from BioRegional Energy Associates of Floyd, Va. was used in some of the reactions. Oak and maple veneer was supplied by Masco Corp. of Taylor, Mich. The compound 1-phenylethene, trivial name styrene, and 2-propene nitrile, trivial name acrylonitrile, were obtained from the Laboratory and Research Products Division of Kodak, Rochester, N.Y. 14650. The compound 2-methyl-1,3-butadiene [78-79-5], trivial name isoprene, was obtained from the Aldrich Chemical Company as product number I-9,551-1.

The reagent grade solvents, 1,4-dioxacyclohexane and dimethylsulfoxide, are from Mallinckrodt Chemical Company and anhydrous calcium chloride is also from Mallinckrodt. Other halide salts used in the experiments came from Fisher, J.T. Baker, and Merck Companies. The hydroquinone solution was 1 weight percent hydroquinone in distilled water.

The present invention will now be further illustrated by certain examples and references which are provided for purposes of illustration only and are not intended to limit the present invention.

EXAMPLE 1

A total of 1.00 g of yellow poplar lignin and 1.30 g of calcium chloride were placed in a 125 mL conical flask containing 22.56 g of dimethylsulfoxide. This was labeled solution A.

A total of 6.07 g of 2-propenamide and 0.46 g of 1-phenylethene were placed in a 125 mL conical flask containing 22.57 g of dimethylsulfoxide. This was labeled solution B. Solution A was stir-bubbled with nitrogen ($N_2$) for about 11 minutes before 0.964 mL of 29.86 percent, aqueous hydrogen peroxide was added to the reaction mixture. $N_2$ was bubbled through the reaction mixture (A) and it was stirred for about 5 more minutes. Solution A was then added to solution B, which had been stirred and bubbled with $N_2$ for 19 minutes while A was being initiated with hydroperoxide.

After a short period of stirring and bubbling $N_2$ through the reaction mixture, the flask was stoppered and placed in a 30° C. bath for 2 days. The reaction was not stirred while in the 30° C. bath. The reaction was then terminated by adding 7 mL of 1% hydroquinone thereto. The reaction mixture was diluted with 100 mL of water and allowed to dialyze against pure water for several days. The dilute reaction product from the dialysis tube was recovered by freeze drying and found to weight 5.5 g. The product was labeled 25-128-LSPI. Yield=73.0 weight percent.

Table 4 gives the results from a series of reactions run to determine if 1-phenylethylene side chains could be attached to lignin. Example numbers of these reactions are shown in parentheses. The synthesis procedure is that described in Example 1. The results of Table 4 show that yield falls off as the amount of 1-phenylethene in the reaction increases to more than 50 weight percent of all monomer in the reaction, becoming zero when pure 1-phenylethene is reacted with lignin. The procedure disclosed in U.S. Pat. No. 4,889,902 fails to graft hydrophobic monomers to plant parts.

Further tests were run to find a new method by which hydrophobic monomers could be attached to vascular plants or their parts. Dimethyl acetamide, dimethlysulfoxide, 1,4-dioxacyclohexane, tetrahydrofuran, and dimethyl formamide were used as solvents during this testing program and sodium chloride or calcium chloride was used as a halide salt. These tests showed that when the reaction was not stirred, yield was less than the amount of lignin originally placed in the reaction. This indicated that the grafting reaction and the previous synthesis method had failed.

Grafting of lignin was achieved by maintaining a shear rate of 150 per second in the reaction by stirring the reaction at 4 Hz. The results of these stirred reactions are given in Table 5 and show that stirring is critical to conducting a synthesis with hydrophobic monomers. The results showed that 1-phenylethene reactions must be stirred at 4 Hz, the preferred halide salt is calcium chloride, and the preferred solvent is dimethylsulfoxide. The reactions of Table 5 were stirred at 4 Hz and precipitated in distilled water. The neutral pH of the precipitation media may have caused excessive loss of the lignin of sample 30-87-3.

Examples 9 and 10 of Table 5 show the effect of continuous stirring of the reactor with reaction yields of over 94 weight percent from each reaction. The data of Tables 4 and 5 thus show that for grafting to occur, a reaction mixture containing more than 50 weight percent or 30 mol percent nonpolar monomer must be continuously stirred. Specific, quantitative stirring rates and the equations by which to calculate them will be presented after disclosure of the series of reactions run to determine these stirring rates. The reactions were run with different monomers that produce plastics.

Table 6 shows data for a spectrum of reactions run to optimize yield and create samples of different molecular weight and composition. All of these reactions were stirred at a rate of 4 Hz throughout the synthesis.

TABLE 4

Grafting Of Yellow Poplar Lignin With Monomer Mixtures.*

| Sample (Example) Number 25-128- | Material Added (g) | | | Yield | |
|---|---|---|---|---|---|
| | Lignin | 1-phenyl-ethene | 2-propen-amide | (g) | (%) |
| LSP1 (1) | 1.00 | 0.460 | 6.077 | 5.5 | 73.0 |
| LSP2 (2) | 1.00 | 0.937 | 5.757 | 9.6 | 125. |
| LSP3 (3) | 1.00 | 1.875 | 5.118 | 6.6 | 82.8 |
| LSP4 (4) | 1.00 | 2.343 | 4.798 | 8.0 | 98.3 |
| LSP5 (5) | 1.00 | 4.687 | 3.198 | 2.3 | 25.9 |
| LS (6) | 1.00 | 1.700 | 0.0 | 1.1 | 40.7 |

*All reactions initiated with calcium chloride and hydrogen peroxide.

TABLE 5

Use of Different Salts in Grafting Reaction.

| Sample Number | Salt Used | Material Added (g) | | | | Yield | |
|---|---|---|---|---|---|---|---|
| | | Lignin | 1-phenyl-ethylene | NaCl | H$_2$O$_2$ | (g) | (%) |
| 30-86-1 (7) | NaCl* | 2.00 | 18.76 | 2.79 | 1.9 mL | 7.06 | 34.0 |
| 30-86-2 (8) | NaCl# | 2.00 | 18.76 | 2.87 | 1.9 mL | 4.75 | 22.9 |
| 30-87-1 (9) | CaCl$_2$* | 2.00 | 18.77 | 2.02 | 1.9 mL | 19.69 | 94.8 |
| 30-87-2 (10) | CaCl$_2$# | 2.00 | 18.75 | 2.07 | 1.9 mL | 19.93 | 96.0 |
| 30-87-3 (11) | CaCl$_2$ | 2.00 | 18.76 | 2.02 | 0.0 mL | 1.59 | 7.7 |

*Low solvent content reaction.
High solvent content reaction.
() = example number.

TABLE 6

Composition and Yield of Copolymer Reaction Mixtures.

| Example Number | Composition (g) | | | | | Yield (g)/(wt. %) | Sample Number |
|---|---|---|---|---|---|---|---|
| | Lignin | 1-Phenyl ethene | CaCl$_2$ | H$_2$O$_2$ (mL) | Solvent | | |
| 12 | 2.00 | 18.76 | 2.02 | 1.0 | 20.04 | 17.80/85.74 | 30-136-1 |
| 13 | 2.00 | 18.76 | 2.01 | 2.0 | 20.00 | 20.28/97.69 | 30-136-2 |
| 14 | 2.00 | 18.76 | 2.07 | 3.0 | 19.99 | 20.37/98.12 | 30-136-3 |
| 15 | 2.01 | 18.77 | 2.02 | 4.0 | 20.02 | 19.10/91.92 | 30-137-1 |
| 16 | 2.01 | 18.78 | 2.02 | 5.0 | 20.02 | 18.53/89.13 | 30-137-2 |
| 17 | 3.03 | 18.78 | 2.00 | 2.0 | 20.00 | 19.14/87.76 | 30-144-3 |
| 18 | 2.00 | 18.76 | 1.01 | 2.0 | 20.10 | 18.84/90.75 | 30-114-2 |
| 19 | 2.01 | 18.79 | 1.52 | 2.0 | 20.01 | 18.77/90.24 | 30-114-3 |
| 20 | 2.00 | 18.79 | 2.01 | 2.0 | 20.05 | 18.81/90.48 | 30-115-1 |
| 21 | 2.01 | 18.76 | 2.52 | 2.0 | 20.07 | 18.98/91.38 | 30-115-2 |
| 22 | 2.01 | 18.76 | 2.03 | 2.0 | 20.01 | 19.52/93.98 | 30-111-1 |
| 23 | 8.00 | 28.15 | 8.00 | 8.0 | 40.02 | 33.16/91.73 | 35-102-1 |
| 24 | 8.04 | 18.76 | 8.00 | 8.0 | 40.03 | 24.14/90.07 | 35-102-2 |
| 25 | 8.01 | 9.39 | 8.00 | 8.0 | 40.10 | 15.45/88.79 | 35-102-3 |
| 26 | 8.00 | 9.38 | 2.08 | 8.0 | 40.08 | 14.56/83.77 | 35-105-1 |
| 27 | 8.03 | 9.38 | 4.04 | 8.0 | 40.09 | 14.98/86.04 | 35-105-2 |
| 28 | 8.02 | 18.76 | 6.02 | 8.0 | 40.00 | 24.93/93.09 | 35-110-3 |
| 29 | 8.05 | 9.34 | 6.00 | 8.0 | 40.05 | 15.53/89.30 | 35-120-3 |
| 30 | 8.02 | 18.69 | 6.00 | 8.0 | 40.24 | 23.25/87.05 | 35-120-2 |
| 31 | 2.01 | 18.79 | 2.02 | 3.0 | 20.10 | 19.47/93.74 | 30-100-4 |
| 32 | 8.02 | 18.79 | 6.03 | 6.0 | 40.02 | 24.83/92.61 | 35-113-3 |
| 33 | 8.01 | 28.14 | 6.01 | 8.0 | 40.09 | 29.32/81.11 | 35-130-3 |
| 34 | 8.01 | 9.38 | 6.28 | 8.0 | 40.00 | 15.89/91.37 | 35-105-3 |
| 35 | 8.00 | 28.10 | 6.00 | 8.0 | 40.14 | 33.02/91.47 | 35-120-1 |
| 36 | 4.00 | 14.07 | 3.00 | 4.0 | 30.18 | 17.11/94.69 | 35-127-1 |
| 37 | 2.00 | 18.78 | 2.04 | 3.0 | 20.06 | 19.13/92.06 | 30-151-2 |
| 38 | 8.06 | 9.38 | 6.00 | 8.0 | 40.05 | 15.59/89.39 | 35-115-3 |

Reaction 36 was run using hardwood lignin recovered by extracting a residue of Masonite manufacture with aqueous base. The residue is called clarifier sludge. This and related reactions show that these products can be made from all of the plants listed under "Source" in Table 2B. These products have been shown to be poly(lignin-g(1-phenylethylene)) by solubility tests, extraction tests, and Fourier transform infrared spectrophotometric analysis. This shows that the reaction being run on lignin is:

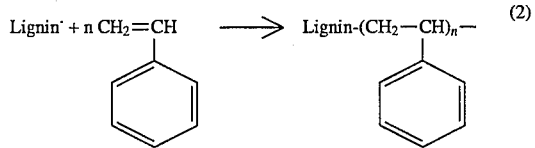

The results of examples 12 to 17 show that there is an optimum ratio of peroxide to chloride to lignin that produces maximum yield and 1-phenylethene conversion. The highest yield occurs at a peroxide to chloride mole ratio of 0.814. At this ratio, quantitative conversion of 1-phenylethene to polymer occurs. The reaction of each plant part with each ethene monomer will have an optimum mole ratio of hydroperoxide to halide ion and there will be weight or mole ratios between the plant part and hydroperoxide or chloride ion which produce maximum yield. At present, these ratios can only be determined experimentally.

The data from examples 18 to 21 and 26 to 28 show that there is a broad range of halide ion concentrations that produce high but not maximum yield. Maximum yield of copolymer can be obtained only when a specific concentration ratio exists between chloride ion, hydroperoxide, and the plant part. Further data, not given here, prove that the weight fraction of plant part to monomer can be varied from 0 to 1. The copolymer's plant content can thus be varied between 0 and 100 weight percent to give any particular plant content desired. Most of the examples of Table 6 were terminated by opening the reaction vessel to air.

Further tests of reactions between lignin and 1-phenylethene showed that run-away reactions which result in explosions or loss of anaerobic atmosphere occur if the starting materials are not kept at or below 30° C. as the reaction is started. Temperature control must be maintained throughout the grafting process and becomes particularly important when dealing with gaseous monomers. Prereacton cooling not only promotes high yield, it also increases the safety of the reaction process, particularly during reactions with very reactive plant parts. The results of reactions with base-extracted, hardwood lignin or kraft pine lignin show that this chemistry allows mixtures of all mass ratios or mole ratios of lignin to monomer, to be graft copolymerized at high yield. This process therefore makes unique materials that can not be obtained by any other method of grafting. These reactions also showed that base-extracted, hardwood lignin reacted particularly rapidly with 1-phenylethene. The kinetics of these reactions depend on both plant part and monomer and can not be predicted at the present time.

Although plants are incredibly complex chemical systems, none of the components indigenous to the plant terminate or interfere with this grafting process. The incredible uniqueness and novelty of the general applicability of this chemistry to the materials of Table 2B can be seen by the fact that even small amounts of such common materials as rust will completely terminate the reaction and completely inhibit grafting.

To obtain high purity research samples, some further purification steps are used. The original solid precipitated upon terminating the reaction is labeled (sample number A) and is extracted with benzene for 48 hours. The benzene-soluble material is recovered by evaporating the benzene and the material is labeled fraction BenEx. The solid not dissolved in benzene is labeled fraction B and is washed with 0.5M sodium hydroxide. This solution is filtered and the filtrate is dialyzed against water for 3 to 5 days using dialysis tubing. The solid, filtered from the base, is dried and labeled fraction C. The diluted solution is then dried or freeze dried to recover product fraction D. This process converts the original sample, (sample numberA), to four different fractions: (sample numberBenEx), (sample numberB), (sample numberC), and (sample numberD).

None of these fractions are pure, but they each contain different fractions of a macromolecular, surface active agent which occupies interfaces between a woody phase and a plastic phase, couples vascular plant parts to a plastic phase, degrades under fungal attack, forms insulating, cellular solids useful as packaging for hot items, forms structured, heterogeneous solids with an internal structure which forms automatically upon cooling, and can release fragments of the original molecule over time as fungi compost the grafted plant part and release repeat unit fragments into the environment. Fraction BenEx, the benzene-soluble part of the product, contains poly(1-phenylethylene) homopolymer and the graff copolymer that has long 1-phenylethylene chains on it. Product C contains graff copolymer with medium-sized 1-phenylethylene chains on it. Product D is any unreacted lignin and graff copolymer with tiny 1-phenylethylene chains on it. These fractions and kraft pine lignin were tested for chemical composition by Fourier transform infrared spectroscopy with chemical identification being obtained from the lignin absorbence peak at 14.66 micrometers wavelength and the poly(1-phenylethylene) absorbence peak at 14.29 micrometers. The infrared spectroscopy results show that the two components of the reaction product, lignin and 1-phenylethylene, are distributed throughout the product's fractions and must be chemically bound. These results farther prove that both plant part and sidechain are distributed throughout the fractionated product and, thus, that the plant part put into the reaction has been quantitatively grafted.

Further tests were run on previously synthesized samples of poly(lignin-g-(1-phenylethylene)) to observe and display its thermoplastic properties. A sample of the graft copolymer was placed between two teflon sheets and the assemblage placed on top of a hot plate and weighed down with a second hot plate. The lower hot plate was already heated to 167 +/−2° C. and the upper hot plate was already heated to 164 +/−2° C. The copolymer samples were kept between the hot plates for 40 to 60 seconds and then the assemblage was allowed to cool. Compressive force was 1 to 1.5 metric tons. Upon opening the enveloping teflon plates, a hard, brittle sheet was found to have been compression cast from the powdered copolymer. The sheets were clear to opaque, brown plastics with a thickness of approximately 0.5 to 1 mm. The physical properties of the sheet and its color varied according to which copolymer had been chosen for compression casting. All were dark brown and were a darker brown than the powder taken to cast the sheet. The copolymers cast were checked for color and brittleness. The results of the tests are summarized in Table 7.

The pure lignin sample was the material used as a reagent in a number of the grafting reactions previously described. Poly(1-phenylethylene) was a commercial product supplied by the manufacturer and used as a comparison material. Examination of the films by eye and twisting the films to break them were used to rank the materials for tint and stiffness. The results clearly show that the graft copolymer is a more ductile and thermoplastic material that will flow at higher temperature and be ductile under common application conditions for a plastic at 25° C. and 1 atmosphere pressure. Because lignin has a glass transition temperature above 150° C., it is a

TABLE 7

Experiments in Forming Plastic Films From Copolymer.

| Sample (Example) Number | Lignin (Wt. %) in Reaction Mixture | Lignin (Wt. %) in Original Product | Yield (Weight %) | Brittleness And Darkness of Plastic Films |
|---|---|---|---|---|
| 1-134-4 | 100. | 100. | — | Maximum |
| 35-105-3A(34) | 46.0 | 50.41 | 91.37 | Great but Decreasing |
| 35-110-3A(28) | 30.0 | 32.17 | 93.09 | Large but Decreasing |
| 35-130-3A(33) | 22.1 | 27.32 | 81.11 | Medium but Decreasing |
| 35-111-1A(22) | 9.68 | 10.30 | 93.98 | Lower and Decreasing |
| Poly(1-phenyl ethylene) | 0.0 | 0.0 | — | Least | brittle, inflexible material while the grafted plant products can be bent and are ductile plastics. Glass transition temperature is a characteristic temperature point in amorphous polymers at which molecular segments containing 50 or more backbone atoms begin to move. It is defined in Chapter VI, pages 209+, of the Polymer Handbook, Third Edition, J. Brandrup, E. H. Immergut, Eds., Wiley-lnterscience, (1989).

The data of Table 7 clearly demonstrate that the reaction products of lignin and 1-phenylethene are thermoplastics. Having established that the copolymers are plastics, data from a series of other thermoplastics will be presented to show the breadth and generality of the new method of synthesis and show the broad spectrum of new compositions of matter that can be made. After examples of these new compositions of matter are given, the unique and novel properties of these materials; surface activity, capacity to populate interlaces, activity as a coupling agent, degradability, use as an insulating foam, self forming composites and use as a slow release agent; will be described and data on these properties will be given.

In the following examples, the compound 2-propene nitrile, trivial name acrylonitdle, was used in the reactions.

2-Propene Nitrile

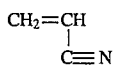

A series of copolymers were made by the procedures of examples 1 to 5 and are listed in Table 8. These data again show that increasing the amount of plastic-producing monomer, 2-propene nitrile, in the unstirred reaction mixture sharply reduces the yield of the reaction, leading to failure of the unstirred reaction. Further study showed that yield could be made quantitative by using the stirred reaction procedure of Table 5, example 9 for reactions with only 2-propene nitrile as monomer. A series of copolymers made by the mixed reaction procedure of example 9 are listed in Table 9. These data clearly show that the synthesis procedure with continuous mixing produces a grafted product with a plastic sidechain and efficient polymerization. Rate of stirring for 2-propene nitrile reactions is 0.4 Hz.

TABLE 8

Reactions to Form Graft Copolymer.*

| | Reagents | | | Yield | |
|---|---|---|---|---|---|
| Sample Number | Kraft Pine Lignin | (g) 2-Propene-nitrile | 2-Propen-amide | in Grams | Weight Percent |
| 19-145-9(39) | 0.50 | 0.35 | 4.17 | 4.82 | 96.4 |
| 19-146-8(40) | 0.50 | 0.78 | 3.74 | 4.91 | 97.8 |
| 19-147-7(41) | 0.50 | 1.19 | 3.33 | 3.50 | 69.7 |
| 19-150-8(42) | 0.50 | 0.79 | 3.75 | 3.28 | 65.1 |

*The sidechain of these molecules is itself a random copolymer.

TABLE 9

Composition and Yield of Copolymer Reaction Mixtures.

| | Composition (g) | | | | | Yield |
|---|---|---|---|---|---|---|
| Sample Number | Lignin | 2-Propene Nitrile | CaCl$_2$ | H$_2$O$_2$ (mL) | Solvent | (g)/ (wt. %) |
| 26-74-2(43) | 4.10 | 9.35 | 3.05 | 4.0 | 20.04 | 13.86/ 103.0 |
| 26-74-3(44) | 3.95 | 6.08 | 3.07 | 4.0 | 20.07 | 9.83/98.0 |
| 26-74-4(45) | 4.05 | 3.13 | 3.02 | 4.0 | 20.57 | 6.34/ 88.30 |
| 26-74-5(46) | 4.02 | 6.15 | 3.05 | 4.0 | 25.02 | 10.14/ 99.71 |
| 26-74-6(47) | 4.00 | 6.16 | 2.51 | 5.0 | 20.01 | 9.29/ 94.29 |

In the following examples, the monomer used was 2-methyl-1,3-butadiene 78-79-5]. Two samples of this product are synthesized with the compositions of Table 8 and the continuous agitation procedure of Table 5, example 9. The stirring rate was 1.33 Hz. These products were both plastic and elastomeric, possessing the property of low modulus, capacity to recover shape, and ability to increase elastic modulus with increase in distention of the solid. Results of these synthesis were listed as Table 10.

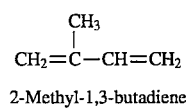

2-Methyl-1,3-butadiene

In another set of examples, the monomers used were 2-propene nitrile [107-13-1] and 1-phenylethene [100-42-5]. A number of these copolymers have been made. The formula for the sidechain is the random copolymer illustrated by the structure of equation 3, where the ratio of m to n is 0.425 to 0.534. These materials were designed to have an m to n ratio spread about a value of

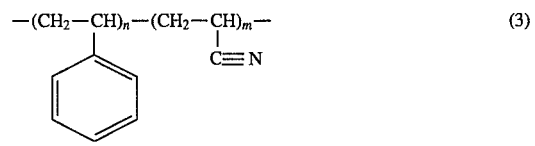

0.44. This ratio allowed the graff copolymer to miscibly dissolve in PHBV (poly(3-hydroxybutrate-r- 3-hydroxyvalerate)) since it produced the same solubility parameter in the sidechain as in PHBV. Solubility parameter is calculated from a substance's heat of vaporization to a gas at zero pressure, E, and its molar volume, V=the amount of space taken up by one mole of the material. Solubility parameter is the square root of heat of vaporization divided by molar volume, $S=(E/V)^{0.5}$.

TABLE 10

Composition and Yield of Copolymer Reaction Mixtures.

| | Composition (g) | | | | | |
|---|---|---|---|---|---|---|
| Sample (Example) Number | Lignin | 2-methyl-1,3-Butadiene | CaCl$_2$ | H$_2$O$_2$ (mL) | Solvent | Reaction Yield (g)/(wt. %) |
| 26-71-2 (48) | 4.11 | 9.32 | 3.02 | 4.0 | 20.29 | 4.21/31.3 |
| 26-71-3 (49) | 4.01 | 3.14 | 3.05 | 4.0 | 20.32 | 4.39/61.4 |

A summary of a series of syntheses which formed these 2-propene nitrile and 1-phenylethene copolymers is given in Table 11. These reactions were stirred at a rate of approximately 3.29 Hz. The exact rate can be calculated from the dipole moment of the monomers in the reaction and their respective mole fractions. The dipole moment of the mixture, $\mu_{mix}$, is given by $$\mu_{mix} = \sum_{i=1}^{n} (\mu_i * X_i) \qquad (4)$$

where, for n monomers in the reaction mixture, $\mu_i$ is the dipole moment of monomer "i" and $X_i$ is the mole fraction of monomer "i". The mole fraction of any monomer is the number of moles of that monomer in the reaction divided by total number of moles of monomer in the reaction. The reaction being run here is the random copolymerization illustrated by the formula:

(5)

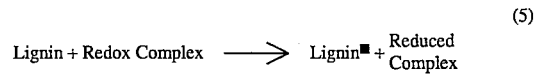

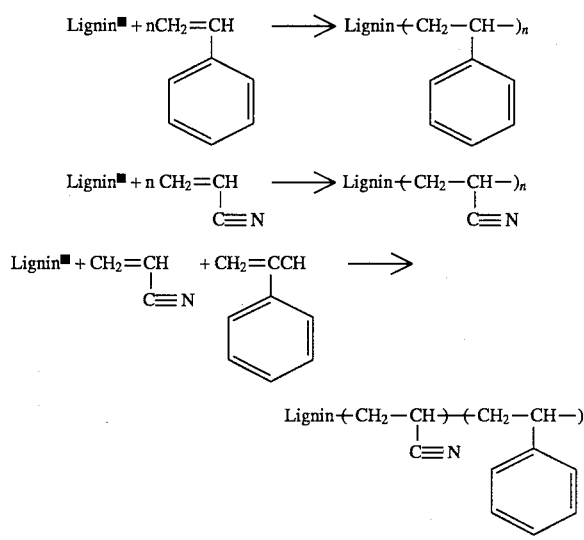

TABLE 11

Lignin-Co-(1-P.Ethylene+2-Propene Nitrile) Samples.

| Sample Number | Lignin (g) | 1-Phenyl ethene (g) | 2-Propene-nitrile (g) | DMSO (g) | CaCl₂ (g) | H₂O₂ (ml) | Yield (wt. %) |
|---|---|---|---|---|---|---|---|
| 44-15-1(50) | 4.15 | 4.71 | 5.62 | 22.03 | 3.00 | 4.00 | 92.5 |
| 44-15-2(51) | 4.02 | 4.80 | 5.58 | 23.28 | 3.09 | 4.00 | 81.4 |
| 44-15-3(52) | 4.13 | 4.89 | 5.38 | 22.13 | 3.04 | 4.00 | 95.6 |
| 44-15-4(53) | 4.16 | 5.00 | 5.32 | 22.54 | 3.05 | 4.00 | 79.4 |
| 44-15-5(54) | 3.97 | 5.22 | 5.30 | 20.06 | 3.22 | 4.00 | 78.8 |
| 44-15-6(55) | 3.94 | 5.30 | 5.19 | 20.13 | 3.15 | 4.00 | 82.3 |
| 44-15-7(56) | 4.03 | 5.42 | 5.45 | 23.97 | 3.51 | 4.00 | 84.6 |

Note that these examples clearly show that many different copolymers with random order of different repeat units in the sidechain can be made by the procedures illustrated here.

In another set of examples, the monomer used was 4-methyl-2-oxy-3-oxopent-4-ene, [80-62-6]. The structure of the compound is:

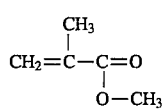

The structure of the product is:

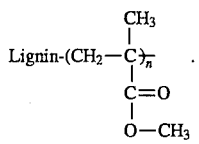

Different bonds through the 4-methyl-2-oxy-3-oxopent-4-ene monomer unit are possible. The results of a number of these reactions are given in Table 12. These data clearly show that numerous, different graff copolymers can be made by conducting this reaction with lignin and monomers that react by free radical polymerization.

TABLE 12

Poly(Lignin-G-(1-(2-Oxy-1-OxoPropyl)ethylene)) Formed Under Various Reaction Compositions

| SAMPLE No. | LIGNIN (g) | A* (g) | CaCL₂ (g) | 30% H₂O₂ (mL) | DMSO (mL) | YIELD (%) |
|---|---|---|---|---|---|---|
| 1-4(57) | 0.50 | 3.41 | 0.75 | 1.00 | 5.33 | 99.09 |
| 2-1(58) | 1.50 | 10.20 | 0.60 | 0.50 | 16.02 | 93.50 |
| 2-5(59) | 1.50 | 10.20 | 0.60 | 5.00 | 16.02 | 96.27 |
| 3-1(60) | 1.50 | 3.59 | 0.60 | 1.50 | 16.02 | 94.70 |
| 3-2(61) | 1.50 | 5.26 | 0.60 | 1.50 | 16.02 | 96.30 |
| 3-3(62) | 1.50 | 9.20 | 0.60 | 1.50 | 16.02 | 94.67 |
| 3-4(63) | 1.50 | 12.38 | 0.60 | 1.50 | 16.02 | 94.16 |
| 3-5(64) | 1.50 | 14.30 | 0.60 | 1.50 | 16.02 | 97.15 |
| 3-6(65) | 1.50 | 17.48 | 0.60 | 1.50 | 16.02 | 96.68 |
| 4-1(66) | 1.00 | 9.20 | 0.40 | 1.00 | 10.68 | 94.51 |
| 4-2(67) | 2.00 | 9.20 | 0.80 | 2.00 | 21.36 | 98.67 |
| 4-3(68) | 3.00 | 9.20 | 1.20 | 3.00 | 26.70 | 95.41 |
| 4-4(69) | 4.00 | 9.20 | 1.60 | 4.00 | 42.72 | 97.20 |
| 4-5(70) | 5.00 | 9.20 | 2.00 | 5.00 | 53.40 | 94.72 |
| 4-6(71) | 6.00 | 9.20 | 2.40 | 6.00 | 64.08 | 98.36 |

*4-methyl-2-oxy-3-oxopent-4-ene.

EXAMPLE 72

A grafted product may be made from a plant part from virtually any plant and I-chloroethene. The structure of I-chloroethene is:

The monomer or a mixture of this monomer and any other ethene monomer mentioned herein can be polymerized with any plant part in any one of a series of solvents by dispersing the plant part and any of a series of metal halide salts, with calcium chloride the preferred salt, in the solvent. Typical solvents are listed in Table 1 and typical salts are listed in Table 2A. Other solvents and salts can be used. The polymerization is initiated by adding a hydroperoxide to the reaction mixture. The monomer, I-chloroethene, is added to the reaction mixture either as a cooled liquid or as an ambient temperature gas and the reaction is allowed to proceed for between 1 and 96 hours, 48 hours preferred, with stirring at a rate of 0.93 Hz. The gaseous monomer may be added by bubbling. The polymer is recovered by precipitation in non-solvents or evaporation of solvent. The structure of the product is:

Plant Part—(—CH$_2$—CH)$_n$—.
                |
                Cl

Syndiotactic, isotactic, or atactic bonds through the I-chloroethene monomer unit are possible.

Polymerizations of 1-chloroethene were run in a 1 m long, heavy walled, glass tube. The mixed lignin, calcium chloride, and dimethylsulfoxide was placed in the tube and saturated with nitrogen. It was frozen in dry ice. The 1-chloroethene was condensed in a 10 cm side arm using liquid nitrogen as coolant before a 30 volume percent solution of hydrogen peroxide in a glass vial was placed on the frozen dimethylsulfoxide solution. The glass tube reactor was evacuated, sealed, and rotated once the dimethylsulfoxide solution had thawed. The amount of lignin added to the reaction was 2.0g and the amount of 1-chloroethene was approximately 4.5g (measured by volume, not by weight). Over 48 hours, the reaction mixture thickened and a gelatinous solid formed in the tube. The solid recovered from the tube did not dissolve in 2M aqueous base, a common and powerful solvent for lignin. Since thermoplastic lignin with a poly(1-chloroethylene) sidechain would not be soluble in any aqueous solution, this was strong proof of graff copolymerization of this gaseous monomer.

EXAMPLE 73

The method of Example 72 is used except that the compound is made from a plant part from any vascular plant and ethene. The structure of ethene is:

CH$_2$=CH$_2$

The rate of stirring is 1.38 Hz. The structure of the product is:

Plant Part-(—CH$_2$)$_n$—

EXAMPLE 74

The method of Example 72 is used except that the compound is made from a plant part from any vascular plant and perfluoroethene. The structure of perfluoroethene is:

CF$_2$=CF$_2$

The rate of stirring of the reaction is 1.4 Hz. The structure of the product is:

Plant Part-(—CF$_2$)$_n$—

EXAMPLE 75

The method of Example 71 is used except that the compound is made from a plant part from any vascular plant and 2-chloro-1,3-butadiene. The structure of 2-chloro- 1,3-butadiene is:

CH$_2$=C—Cl
     |
     CH=CH$_2$

The compound produced by this reaction will be poly(plant part-g-(2-chlorobut-1,4-diyl- 2-ene) or any of the structural enantomers of the free-radical polymerization of 2-chloro-1,3-butadiene). One structure of the product is, Cl
            |
Plant Part—(—CH$_2$—C=CH—CH$_2$—)$_n$, but 1,2; 3,4; or other polymerization patterns make different structures in the product. Different bonds through the 2-chloro-1,3-butadiene repeat unit are possible such as 1,2-ylene bonding.

EXAMPLE 76

The method of Example 71 is used except that the compound is made from a plant part from any vascular plant and dichloroethene. The structure of dichloroethene is:

CH$_2$=CCl$_2$ or CHCl=CHCl

The stirring rate of the reaction is 0.8 to 1.4 Hz with the rate increasing as the mole fraction of trans-1,2-dichloroethene increases from 0 to 1. The structure of the product is:

Plant Part-(—CH$_2$—CCl$_2$)$_n$— or

Plant Part-(—CClH—CClH)$_n$

Syndiotactic, isotactic, head-to-tail, or other bonds through the dichloroethene repeat unit are possible.

EXAMPLE 77

The method of Example 72 is used except that the compound is made from a plant part from any vascular plant and I-propene. The structure of I-propene is:

CH$_2$=CH—CH$_3$

The stirring rate of the reaction is 1.25 Hz. The structure of the product is:

Plant Part—(—CH$_2$—CH—)$_n$.
              |
              CH$_3$

Syndiotactic, isotactic, and atactic bonds through the I-propene repeat unit are possible.

EXAMPLE 78

The method of Example 71 is used except that the compound is made from a plant part from any vascular plant and 2-oxy-3-oxopent-4-ene. The structure of 2-oxy- 3-oxopent-4-ene is:

CH$_2$=CH—C=O
          |
          O—CH$_3$

The structure of the product is:

Plant Part-(CH$_2$—CH)$_n$—
              |
              C=O
              |
              O—CH$_3$ Head to tail, syndiotactic, or other bonds through the 2-oxy-3-oxopent-4-ene repeat unit are possible.

EXAMPLE 79

The method of Example 71 is used except that the compound is made from a plant part from any vascular plant and 2-oxo-3-oxypent-4-ene. The structure of 2-oxo- 3-oxypent-4-ene is:

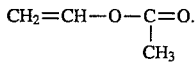

The structure of the product is:

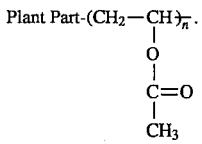

Syndiotactic, isotactic, or head-to-tail bonds through the 2-oxo-3-oxypent-4-ene repeat unit are possible.

EXAMPLE 80

The method of Example 71 is used except that the compound is made from a plant part from any vascular plant and 2-methyl-2-propenoic acid. The structure of 2-methyl-2-propenoic acid is:

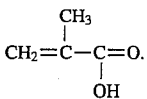

The structure of the product is:

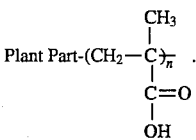

Syndiotactic, isotactic, or head-to-tail bonds through the 2-methyl-2-propenoic acid repeat unit are possible.

In the next example, the monomer is 2N-methyl-2-imino-3-oxopent-4-ene,

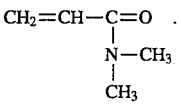

EXAMPLE 81

A total of 0.50 g of lignin and 0.63 g of calcium chloride were placed in a 125 mL conical flask containing 11.28 g of dimethylsulfoxide and were dissolved. The mixture was stir-bubbled with nitrogen ($N_2$) for about 2 minutes before 0.482 mL of hydrogen peroxide were added to the reaction mixture. $N_2$ was bubbled through the reaction mixture for about 2 more minutes, the system was stirred for about 3 minutes, and 4.52 g of 2N-methyl-2-imino-3-oxopent-4-ene (I) was added. After about 4 minutes of stirring and bubbling $N_2$ through the reaction mixture, the flask was stoppered. It was then placed in a 28° C. bath for 2 days. The reaction was then terminated by adding 0.5 mL of 1% hydroquinone and 100 mL of water thereto. The solution remained single phase during this dilution and smelled sweet. The dilute solution was placed in a dialysis tubing and dialyzed against water for 3 days. The dilute reaction product in the dialysis tube was centrifuged at 5000 rpm for 40 minutes in a Sorvall centrifuge using a GSA head. The solids in the supernate were recovered by freeze drying and found to weigh 1.92 g. The product was labeled 26- 16-1. Yield = 38.24 weight percent.

The previous examples and discussion have shown that reactions conducted with hydrophobic monomers will not produce grafting unless the reaction is continuously stirred. Further, the rate of stirring depends on the monomer being reacted with the plant material. The rate of stirring which produces grafting and allows high yield of graft copolymer must be determined from the monomer's dipole moment and its solubility in water. The symbol for dipole moment is N- and the property is expressed in units of debye, abbreviated as a "D". The dipole moment of a molecule is the distance in centimeters between separated accumulations of positive and negative charge times the magnitude of one of the accumulations of charge, expressed in electrostatic units. These charge separations are structural features of a molecule caused by its atomic structure and are therefore characteristic of the molecule.

The dipole moments and solubility limits of a group common monomers are given in Table 13. Those monomers that have a solubility in water at 30° C. of more than 200 g of monomer per 100 g of water and a dipole moment of more than 1.2, need not be stirred to produce graft copolymer. Those monomers that have a solubility of less than 5 g of monomer per 100 g of water at 30° C. and a dipole moment of less than 1.8, must be stirred to produce graft copolymer from the grafting reaction. The rate of stirring is determined by the dipole moment of the monomer. The value of the dipole moment, µ, of the monomer is expressed in debye units, D, where 1 D=$3.33564 \times 10^{-30}$ coulomb-meter. Note that there is no contradiction between the solubility-dipole moment limits just propounded. The monomer which must simultaneously have a solubility in water at 30° C. of more that 200 g of monomer per 100g of water and a dipole moment of more than 1.2, before it need not be stirred in a grafting reaction. Monomers that Simultaneously have a solubility of less than 5 g of monomer per 100 g of water at 30 ° C. and a dipole moment of less than 1.8, must be stirred to produce graft copolymer from the grafting reaction.

If the absolute value of the stirring rate of the solution in Hz is labeled |x| and related to the dipole moment of the monomer, a quadratic equation is produced that acts as a guide for the design of a reaction. The equation relating absolute value of stirring rate to dipole moment is $a|x|^2 + b|x| + c = \mu$, where a=0.0024719 $D/Hz^2$, b=−0.3516 D/Hz, and c=1.381 D. Stirring rate is actually controlling "tip speed" of the stirring bar. "Tip speed" is the velocity of the ends of the stir bar or paddle in the reaction tank. This "tip speed" is a critical variable in mixing. Shear rate is approximately 12 times stirring rate in Hz. Shear stress is equal to viscosity times shear rate and shear stress is the fundamental value controlling the mechanochemistry of phase stability and mixing in the reaction. The reaction mixture should have a shear rate perpendicular to the direction of stirred flow of between 0.01 per second and 6,000 per second. High shear rates in the reaction should be avoided because they will cause the formed polymer to mechanically degrade.

TABLE 13

Dipole Moments and Solubility Limits of Some Common Monomers.

| Monomer Name | Dipole[#] Moment | Solubility Limit in 100 g of Water at 30° C. |
| --- | --- | --- |
| 1-Bromoethene | 1.28 | insoluble |
| 1-Chloroethene | 1.44 | 0.86 |
| 1-Fluoroethene | 1.427 | insoluble |
| 1,3-Butadiene | 0.0 | insoluble |
| 2-Propenamide | 1.38* | 215.5 |
| 2-Methylprop-2-enoic Acid | 1.65 | miscible |
| 3-Oxy-2-oxopent-4-ene | 1.70 | 2.33 |
| Cyclopentene | 0.93 | insoluble |
| Pentyne | 0.86 | insoluble |
| 2-Methyl-1,3-butadiene | 0.15 | insoluble |
| 1,3-Pentadiene | 0.68 | insoluble |
| 4-Methyl-2-oxy-3-oxopent-4-ene | 1.60 | less than 2.0 g |
| 1-Phenylethene | 0.37 | insoluble |

[#]Data from "Tables of Experimental Dipole Moments, Aubrey Lester McClellan, W.H. Freeman and Company, San Francisco, (1963)
*Dipole moment calculated from an AM1 quantum mechanical calculation on the planar 2-propenamide molecule.

Before proceeding to examples of structured plant parts that are grafted, it is important to document the novel and unexpected properties of the products just made. These materials have been shown to be thermoplastic, but they also occupy interfaces between wood and plastic; couple wood and plastic phases; spontaneously form internally structured solids; increase binding strength between wood and plastic phases; form insulating, hydrophobic foams; form a product in which both components, backbone and sidechain, degrade under fungal attack; and during this degradation, release fragments from either backbone or sidechain into the environment to produce a time-dependent concentration of that degradation product.

The grafted products have the amazing property of being surface active materials. This was shown by the capacity of these molecules to form emulsions between incompatible fluid phases and to bond and coat wood surfaces. The lignin grafted with 1-phenylethene formed microemulsions between benzene and aqueous base. This middle phase was declared a microemulsion because it remained stable over a period of weeks after the copolymer and two fluid phases were shaken together. The microemulsion was made from 60 mL of 0.5M aqueous sodium hydroxide mixed with a 3.75 weight percent solution of copolymer in 20 mL of benzene. The samples were prepared in a graduated cylinder, capped with a rubber stopper, shaken and allowed to stand for 6 months while the phase volumes were measured. The copolymers used were Examples 14, 23, 24, and 25. The copolymer from example 14 formed the largest microemulsion between the two fluids by converting 37 volume percent of the fluid to a middle phase. The other copolymers formed progressively smaller volumes of middle phase. Pure lignin, poly(1-phenylethylene), and mixtures of the two separate chemicals did not form microemulsions. The capacity of the grafted products to form microemulsions can be estimated from the weight percent of plant product and sidechain in the reaction product and the solubility parameters of 1. the two graft product parts and 2. the two fluids being mixed. A broad spectrum of fluids can be formed into microemulsions using different sidechains in the grafted product.

These products also occupy surfaces on wood and act to alter the wetting properties of the plant material. Contact angle measurements were used in testing how well the graft copolymer acts as a wetting agent for wood. The products made by grafting plant parts are such wetting agents and we tested them by measuring how much the materials changed the contact angle of water on birch wood (Betula albosinensis septentrionalis). The dynamic contact angle measurement was based on the Wilhelmy plate technique. The contact angle of birch is 50.8°, that of lignin is 87°, and that of pure poly(1-phenylethene) is 105°. The treated birch samples were prepared by spreading a 5 or 10 weight percent solution of graft copolymer in dimethyl formamide on the wood surface with a glass rod and drying the coated wood.

The grafted plant parts and lignin gave smooth, adherent surface coatings on the wood. Plastics and plastic-plant part mixtures did not give adherent coatings. Birch surfaces treated with plastic or plastic-plant part mixtures develop solid flakes on the surface which fall off with time or any physical contact. Further, the adherent, grafted coatings change the wetting behavior of the wood. Sample 35-110-3A, the product of example 28, changed the contact angle of water on birch from 50.8°, water wet, to 110° for product 3A, 99.1° for fraction 3B, and 119.5° for fraction 3BenEx. The fractions and the means of obtaining them are defined in a previous discussion of characterization. Sample 35-120-1, the product of example 35, changed contact angle from 50.8° to 107.8° for product 1 A, 99.1° for 1 B, and 114° for fraction 1BenEx. Note that the capacity to change wood wetting behavior varied with the fraction applied to the surface. Generally, the fraction extracted from the reaction product and recovered from the extraction solvent (BenEx) changes the contact angle most with lesser change produced by the original reaction product(A) and the extraction residue(B). These data show the application rules for this new technology of surface alteration by novel, grafted plant parts. Those product fractions with the longest sidechains alter contact angle most while products with smaller sidechains alter contact angle to a lesser degree. These same treatments and tests have been performed with wood and plant parts grafted with 2-propene nitride, 2-propene nitrile/1-phenylethene randomly repeating units, or 2-oxy-3-oxo-4-methylpent-4-ene.

These data show that the new products of lignin and plant parts are surface active, preferentially orienting the lignin or plant portion of the product towards wood while the plastic sidechain is oriented outward to create a new surface with different wetting properties. Thus, these copolymers are surface-active, coupling agents which can bind wood to hydrophobic phases such as plastic. This coupling process works best when the wetting agent has been synthesized so that the sidechain attached to the lignin during the preparation of the macromolecular, surface active agent is chemically identical to the plastic hydrophobic phase that is to be bound or connected to the wood. Thus, to bind poly(1-phenylethylene) [Trivial name=polystyrene] to wood, coat the wood with poly(lignin-g-(1-phenylethylene)) and to bind poly(1-cyanoethylene) [Trivial name=polyacrylonitrile or orlon] to wood, coat the wood with poly(lignin-g-(1-cyanoethylene)). It is also possible to bind the coated wood to any plastic phase that will form a polymer alloy with the sidechain of the copolymer. Polymers that are preferred blending or binding phases for use in this disclosure can be identified by thermodynamic data or experiment. The most convenient datum for identifying a polymer to bind to the coated wood is solubility parameter. Generally, these polymers are those with a solubility parameter that is within five, and preferably within two, units of the solubility parameter of the sidechain attached to the plant part.

The wood is best coated by melted or dissolved copolymer. The binding of plastic to coated wood is best done with rolling operations such as calendering or coating; stretching operations such as film casting or film blowing; or cyclic processes such as injection molding or thermoforming. Since the coated product contains wood, a structured phase, care must be taken in all operations to avoid breaking or crushing the wood. It is preferred to heat the polymer to or above its glass transition temperature during the binding process.

The coupling of wood by a grafted plant part to a plastic, that has the same or similar composition as the sidechain on the plant part, increases the binding strength of the plastic to the wood. This was proven by performing lap shear tensile strength tests on birch strips onto which were injection molded blocks of plastic. The samples with a grafted product coating with the same repeat units in the sidechain as in the plastic gave 20 to 50 percent higher tensile strength. The coupling experiments were performed as follows. Birch Depressors, a medical product of 1.75 mm thickness from Solon Manufacturing Company, Solon, Maine 04979 were cut into suitable sizes to match an injection mold. Kraft pine lignin was reacted into a graff copolymer as previously described. The homopoly(1-phenylethylene) used in coupling tests is a recovered fraction of the reaction product of mechanical pulp and 1-phenylethene. Copolymer was prepared as a 10 weight percent solution in dimethylformamide. Coat the wood surface with the sample solutions and dry the coated wood slabs in a hood at room temperature for 24 hours. Store the dried wood slabs in a desiccator at room temperature and 50+5 percent relative humidity. The plastic phase was Amoco RIPO, a commercially available poly(1-phenylethylene) from Amoco Chemical Company, Naperville, Ill. 60566. Injection molding was done on a Milberry, Model 50 Mini-Jector. Experimental conditions were: Cylinder temperature, 550° F.; Nozzle temperature, 340°–350° F.; Pressure, 500 psi; Pressure holding time, 12 seconds; and Chilling time, 1–2 minute.

Adhesion area was be measured for a representative group of molded specimens. It averaged 0.4740+0.0006 square inches. Lap shear strength of the pieces of wood with plastic injection molded to them was tested on a Instron, Model 4200, Universal testing instrument. Experimental conditions were: room temperature, 23° C.; room relative humidity: 50 percent; Crosshead speed, 2.54 mm/min.; with the sample in hand-fastened grips and an aluminum specimen holder. The lap shear strengths of the wood-plastic samples are summarized in Table 14. As these data clearly show, it is critical for the grafted, two component composition to be between the plant and plastic phases. The grafted constituent allows the plastic to wet the wood and it can only perform this function if it covers 10 percent or more of the surface area of the plant phase. The grafted plant or its constituent can be placed on the surface of the plant phase by dry or solvent coating, sputtering, melting, or blending operations.

TABLE 14

Summarized Adhesion Strength Results.

| Coating Material | Adhesion Strength (PSI)* |
| --- | --- |
| 30-151-2A (10.45% lignin) | 351.3 ± 31.8 (3) |
| 30-151-2B (See Ex. 37) | 335.6 ± 70.8 (3) |
| 30-151-2 Ben.Ex | 308.4 ± 6.4 (3) |
| 10% Lig. + 90% PS | 320.4 ± 36.4 (5) |
| 35-120-1A (24.23% lignin) | 335.6 ± 11.8 (3) |
| 35-120-1B (See Ex. 35) | 330.5 ± 42.7 (2) |
| 35-120-1 Ben.Ex. | 303.7 ± 31.0 (3) |
| 24% Lig. + 76% PS | 294.0 ± 26.9 (4) |

TABLE 14-continued

Summarized Adhesion Strength Results.

| Coating Material | Adhesion Strength (PSI)* |
| --- | --- |
| 35-110-3A (32.17% lignin) | 280.0 ± 44.1 (3) |
| 35-110-3B (See Ex. 28) | 277.2 ± 26.8 (3) |
| 35-110-3 Ben.Ex. | 387.3 ± 30.1 (3) |
| 32% Lig. + 68% PS | 282.7 ± 38.5 (5) |
| 35-115-3A (51.70% lignin) | 411.7 ± 8.7 (3) |
| 35-115-3B (See Ex. 38) | 395.0 ± 47.7 (3) |
| 35-115-3 Ben.Ex. | 392.7 ± 10.2 (3) |
| 50% Lig. + 50% PS | 267.3 ± 13.2 (5) |
| Poly(1-phenylethene) (PS) | 296.0 ± 30.0 (5) |
| 10% Lig. + 90% PS | 320.4 ± 36.4 (5) |
| 24% Lig. + 76% PS | 294.0 ± 26.9 (4) |
| 32% Lig. + 68% PS | 282.7 ± 38.5 (5) |
| 50% Lig. + 50% PS | 267.3 ± 13.2 (5) |
| Lignin | 308.0 ± 23.8 (5) |
| Blank (treated with DMF) | 293.3 ± 17.5 (2) |
| Blank (treated with nothing) | 264.8 ± 24.0 (4) |

*To convert psi to KPa, multiply by 6.8966. Thus, 351.3 psi = 6.8966 KPa/psi × 351.3 psi = 2423 KPa. Number of repetitions of the tensile strength test is in parentheses.

In almost all cases, coating the wood with any of the three fractions of the graft copolymer of lignin and poly(1-phenylethene) (Product A, Product B, and Product Ben. Ex.) provides stronger adhesion between wood and commercial poly(1-phenylethene) than coating the wood with mechanical mixtures, pure poly(1-phenylethene), pure lignin, or nothing (blank). As the fraction of wood in the 2 phase solid increases, the tensile strength of the wood-plastic solid increases toward 175 MPa and the compressive strength changes toward 43 MPa. These values are, respectively, the tensile strength and compressive strength of wood. The compressive strength of the 2 phase solid will be between 5 and 150 megapascals.

These grafted materials have unique, unexpected properties not seen in plastics, the starting reagents, or mixtures of unreacted plant parts and plastics. When heated above their glass transition temperature, the temperature at which an amorphous solid becomes ductile, and allowed to cool, these grafted products spontaneously form solids with a distinct, microscopic structure. The formation of stable microdomains within these solids is not the bulk phase separation which would occur in a mixture of plant part and plastic. Such a mixture would form large domains of the components of the mixture and these "clumps" made up of either phase would continue to aggregate, as long as the mixture is above its $T_g$, until complete phase separation occurs.

The graft plant parts, however, form microdomains of individually dispersed fibers, filaments or molecular aggregates. When molecular aggregates form, they are thermodynamically stable and have dimensions of 100 micrometers or less. Commonly, these aggregates have at least one dimension, diameter or thickness, which is 5 micrometers or less, This property is of interest because the plant part both plasticizes the solid and separates out into a microphase which permeates and reinforces the plastic. The formation of this separated solid is controlled by the composition of the reaction mixture used to make the copolymer and the molecular size of the product. The existence of these structured solids can be verified by measurements of the glass transition temperature of the new solids. Samples of 5 to 10 mg of reaction product were heated at 10° C. per minute in a differential scanning calorimeter to monitor heat capacity as a function of temperature. Studies on metal alloys have shown that internally structured solids have two glass transitions, with the temperature of each transition produced by the composition of each phase. This same phenomenon is seen in these grafted plant pads, as shown by the data of Table 15. The structures which can form within these cooled plastics or polymers, fillers, extenders, nucleating agents, stabilizers, crosslinkers, and conditioning agents.

TABLE 15

Differential Scanning Calorimetry Data For Lignin, Poly(1-phenylethylene), and Graft Copolymer.

| Sample Number | Lig. % in Reaction | Lig. % in A | Peak(s, °C.) | | Ramp °C./min. | Material |
|---|---|---|---|---|---|---|
| Amoco RIPO | 0 | 0 | 102.6 | | 10 | pure poly(1-phenylethylene) |
| 30-95-1 LIG | 100.0 | 100.0 | 116.17 | | 10 | pure lignin |
| 35-102-4BB | 100.0 | 100.0 | 150.82 | | 10 | blank reaction lignin |
| 30-100-4A (31) | 9.6 | 10.32 | 94.82 | (114.62)* | 10 | Copolymer |
| 35-130-3A (33) | 22.0 | 27.32 | 98.43 | (133.97)* | 10 | Copolymer |
| 35-110-3A (28) | 30.0 | 32.17 | 98.23 | (124.10)** | 10 | Copolymer |
| 35-120-2A# (30) | 30.0 | 34.49 | 102.35 | (144.48)** | 20 | Copolymer |
| 35-113-3A (32) | 30.0 | 32.30 | 95.73 | 133.25 | 10 | Copolymer |
| 35-105-3A (34) | 46.0 | 50.53 | 94.11 | 125.12 | 10 | Copolymer |
| 35-120-3A# (29) | 46.0 | 51.84 | 101.63 | 143.27 | 20 | Copolymer |

Figure 3:
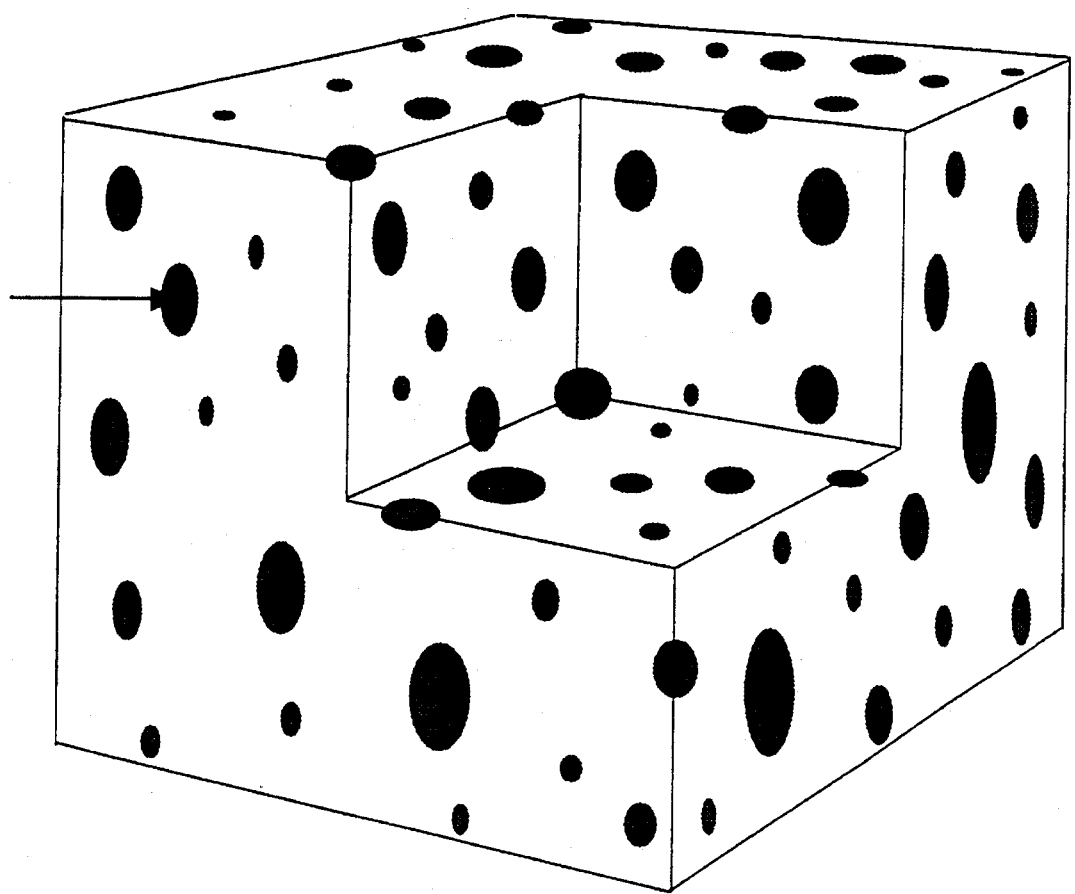
FIG. 3 is an image of the thermoplastic solid with internal, spherical microdomains indicated by an arrow.
Figure 4:
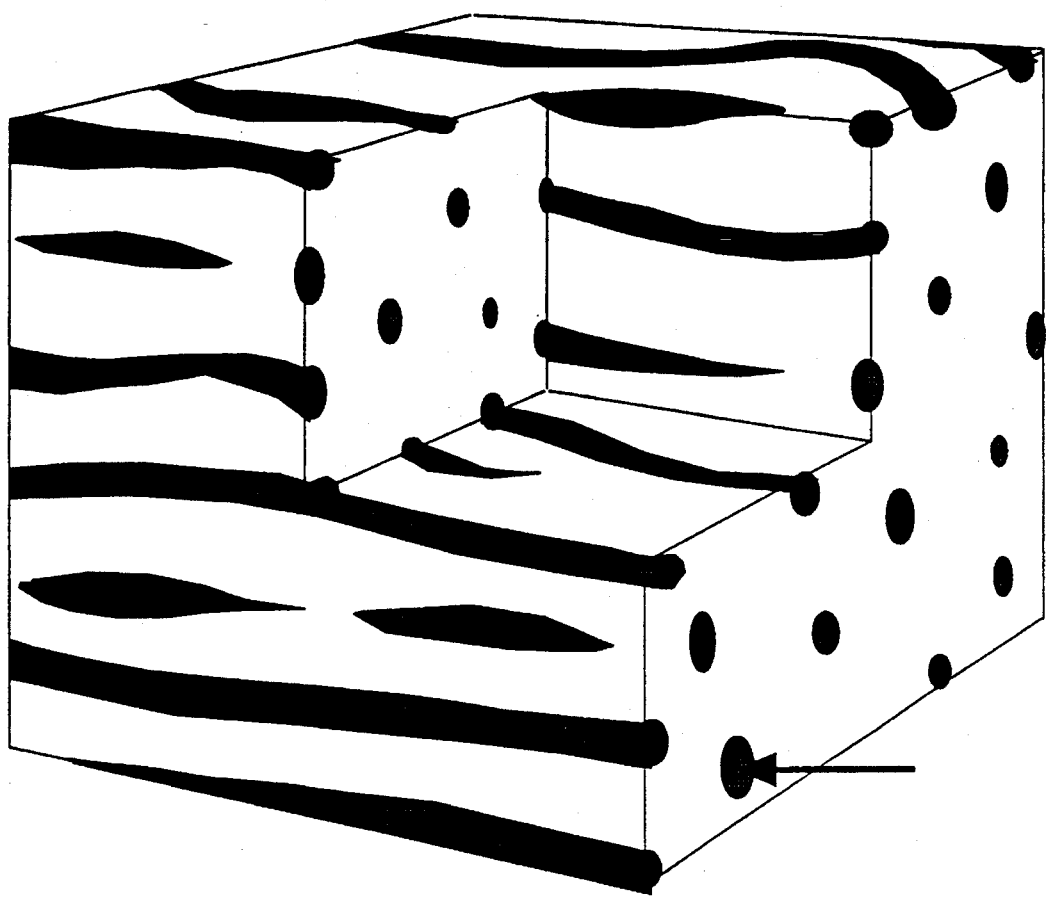
FIG. 4 is an image of the thermoplastic solid with internal, cylindrical microdomains indicated by an arrow.
Figure 5:
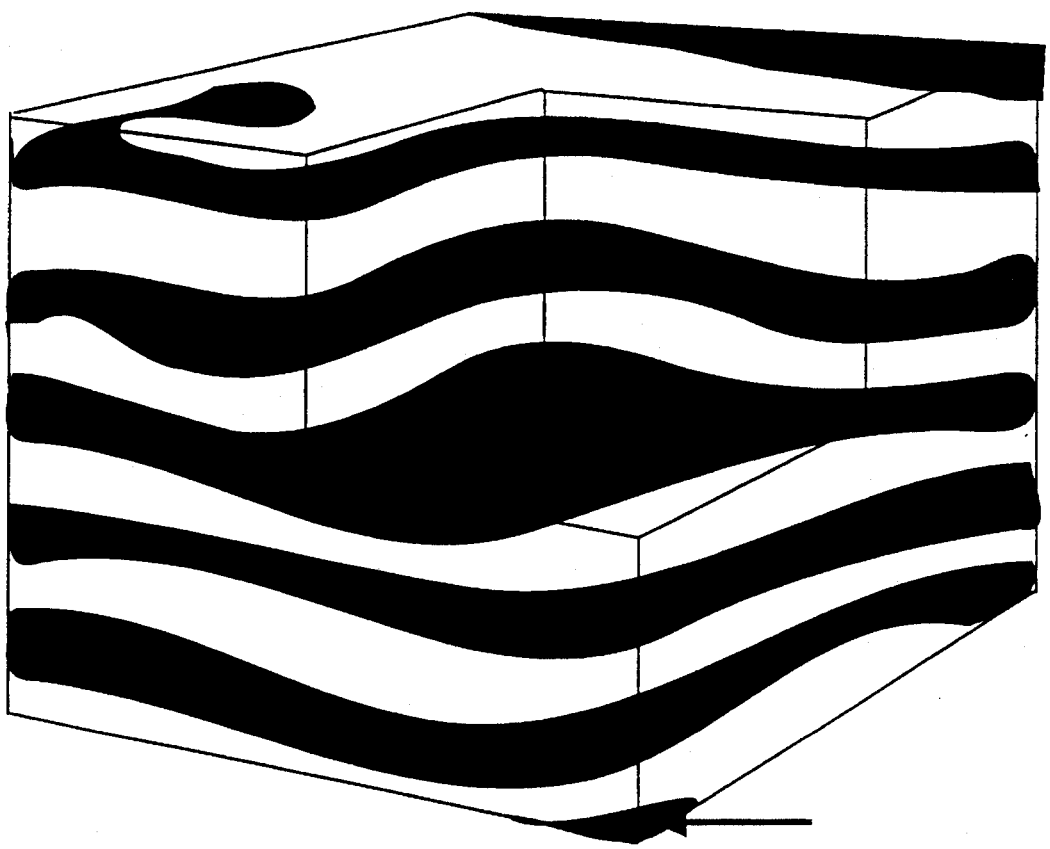
FIG. 5 is an image of the thermoplastic solid with internal, lameliar microdomains indicated by an arrow.
Figure 6A:
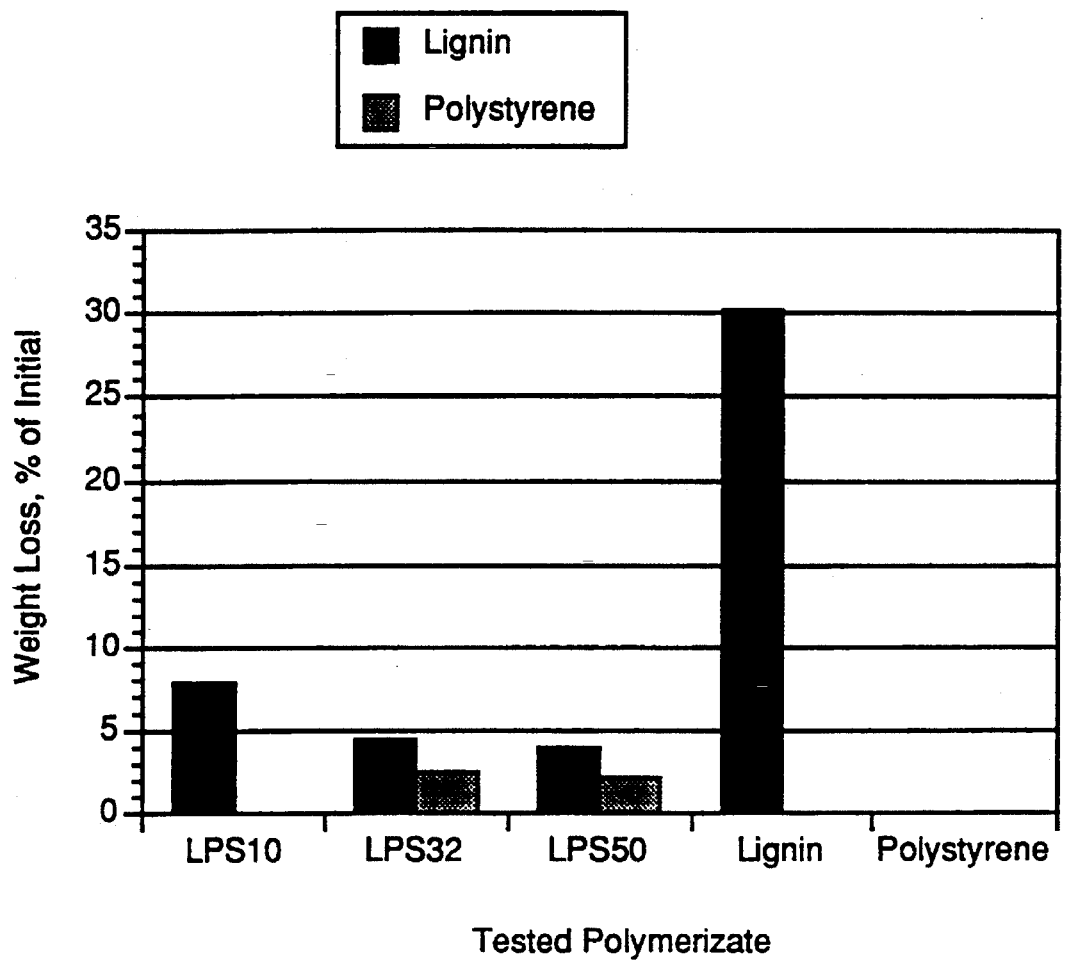
FIGS. 6A, 6B, 6C, and 6D are bar graphs of weight loss for each of vascular plant structural constituent and grafted sidechain after 68 days of incubation with four fungi.
Figure 6B:
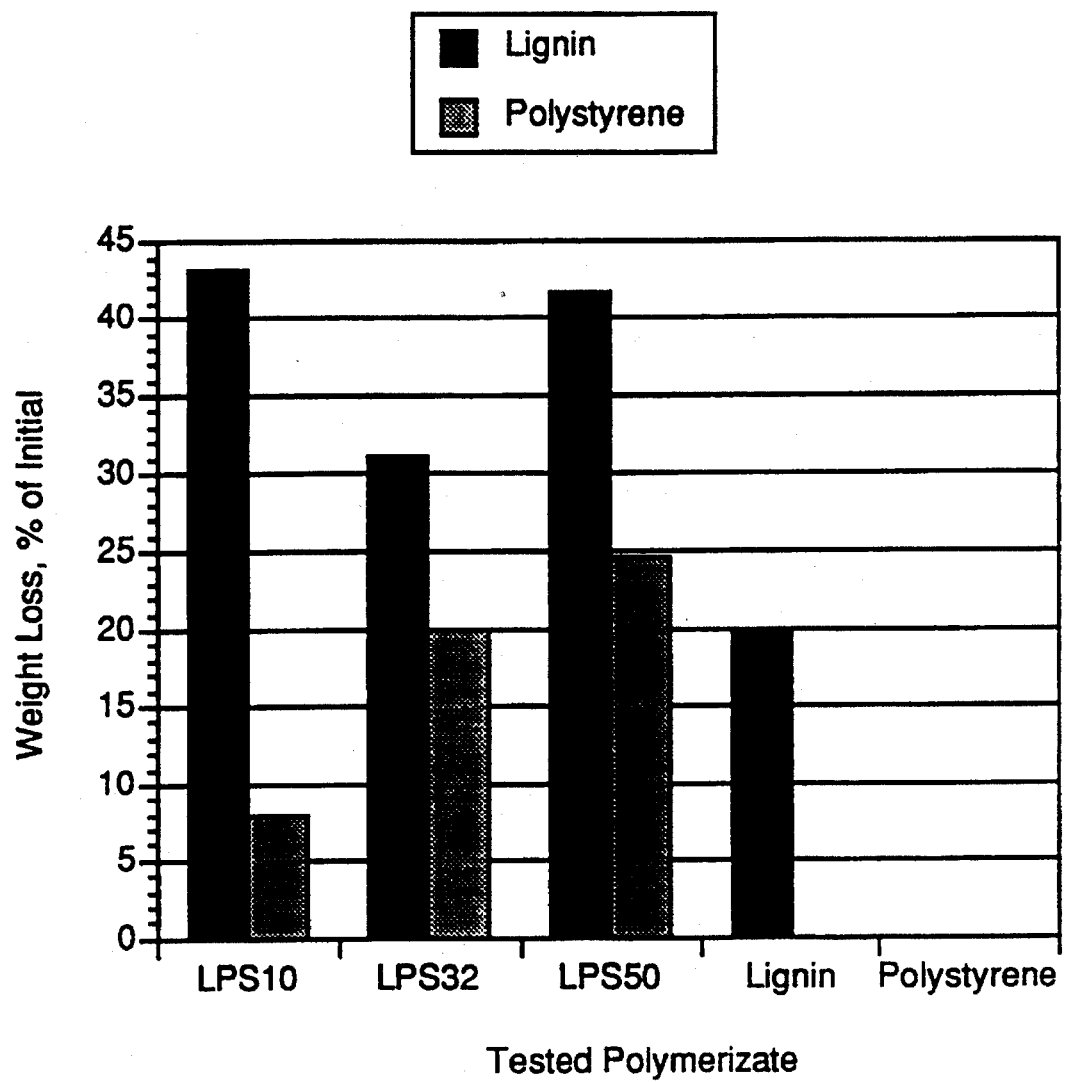
Figure 6C:
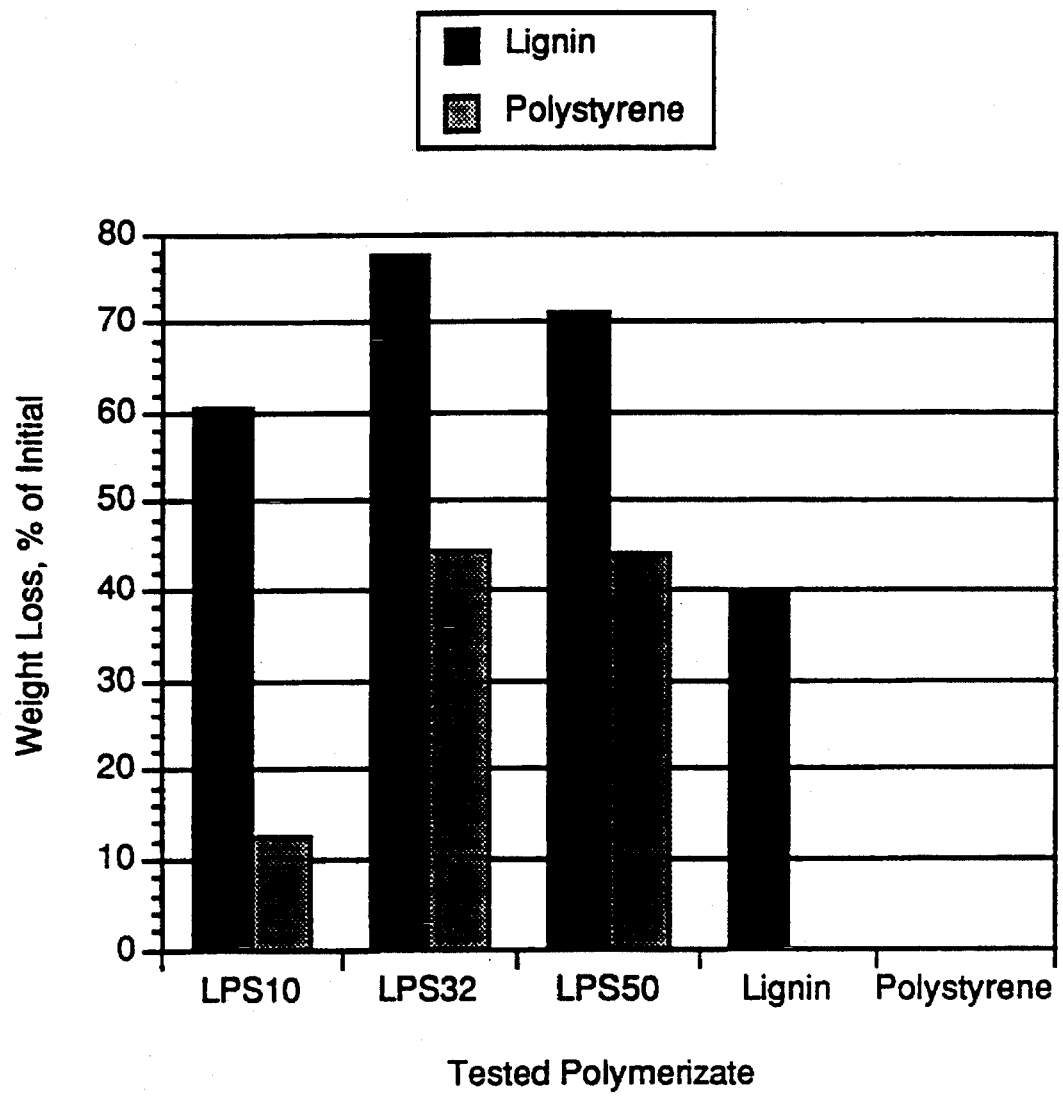
Figure 6D:
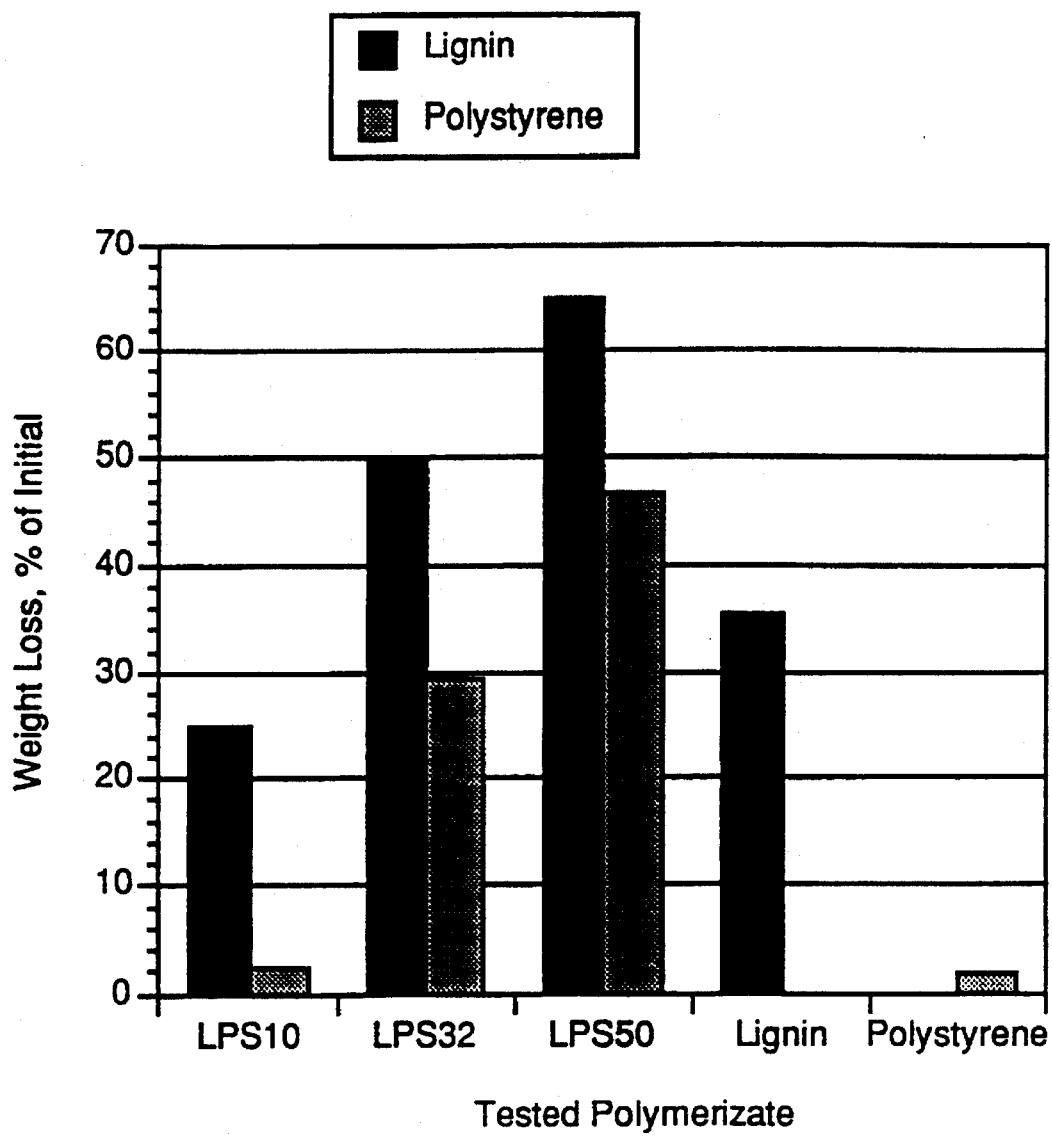

1-134-4 lignin was used.
*very small peak
**small peak solids are small spheres of plant part in a plastic phase, small threads of plant part in a plastic phase, hexagonally arrayed threads of plant part in plastic phase, thin layers of plant part separated from one another by thin layers of plastic, and each of the previous list of structures with the plant part and plastic phases exchanged in position. The labels "thin" and "small" mean 100 µm or less. The small dimension of the spheres and cylinders is normally the diameter while the small dimension for the layered structure is normally the layer thickness. Illustrations of the structures suggested by the differential scanning calorimetry data and the microemulsion data are given as FIGS. 3, 4, and 5.

These new, internally structured solids are extremely useful since they constitute self-forming composites, materials with a rheology controlled by internal structure, sound dampening materials, and substances with directionally anisotropic physical properties. Such substances, with tensile strength, impact strength, ductility, malleability, conductivity, absorbance, and dampening which depend on orientation of the solid, have extremely functional uses in smart materials and new products. Electron micrographs of plant parts grafted with electron absorbing monomers (Table 16, example 89) show distinct plant and plastic phases in the copolymer. See FIG. 7.

These new grafted products can be blended with other reagents and heat treated or formed to make novel, highly functional articles. Of particular importance is the foam that can be formed from these plant part plastics. Foam is used to mean cellular polymer, foamed plastic, expanded plastic, and plastic foam, all common labels in use. The foam is a two-phase, gas-solid material in which the solid is continuous and at least partially composed of the grafted composition of this disclosure. "Cells" are the gas phase in the foam. If the cells are discrete such that the gas phase of each is independent of that of the other cells, the foam is termed closed-cell. The foams of this disclosure are usually closed cell. At gas volumes less that 70 to 80 percent of total volume, the cells are spherical or ellipsoidal while at larger gas volumes the cells become packed, regular dodecahedra. The cells are usually 1 cm or less in diameter with 1 mm or less a preferred diameter. The cells contain blowing agent, air, or other gases generated during foaming. The solid contains the grafted composition of this disclosure, other Foams are formed by increasing internal pressure of a gas phase or by decreasing external pressure on the solid. Internal pressure to form a foam is usually increased by a blowing agent. Typical blowing agents are isomeric pentanes and hexanes, halocarbons, $C_1$ to $C_8$ hydrocarbons, air, carbon dioxide, water, nitrogen, noble gases, and chemicals which release a gas such as sodium citrate-sodium hydrogen carbonate or water-isocyante. Blowing agents represent 0.5 to 25 weight percent of the formulation with 2 weight percent being a usual value. The grafted composition can be polymerized in the presence of a blowing agent but it is preferred that the grafted composition and blowing agent be heated and blended together. After forming and cooling under pressure, the grafted composition-blowing agent mixture is an expandable particle. The expandable particles are converted to foam in two steps. First, the particles are expanded by steam, hot air or hot water to make prefoamed beads and then the aged prefoamed beads are placed in a mold and heated again. This melds the prefoamed beads into a single piece.

When all or part of an additive volatilizes within these new thermoplastics while the plastic is above its glass transition temperature, the surface tension of the plastic and its high viscosity keep the bubble inside the melt, producing a cavitated, porous solid as the plastic cools. These solids with extensive, microporous structure and a low density can be intentionally formed to take advantage of the very low thermal conductivity of the multicellular solid created. These materials can be used as insulating filling in refrigerators; solid, hard panels to replace soft, crushable insulation like glass wool in houses; and, most preferred, as disposable, insulating packaging. The plastic foams have hard, contiguous surfaces which maintain substances on their surface while having very low heat transfer rates though the foam. Thus, hot objects packaged in this foam stay hot for long periods with the duration of temperature maintenance increasing with increasing thickness of the foam. Since moisture and gasses do not pass through the foam, the contents of the packaged object stay inside the package. Of particular importance, however, is the unique ability of this foam to degrade completely in both its backbone content and sidechain content when the foam is exposed to the normal conditions of the forest floor.

These materials are compostable and will degrade completely in moist air and contact with soil by degradation and digestion by white rot fungi. Products of starch, cellulose, and poly(hydroxybutric acid) blended into a synthetic polymer show appreciable biodegradability of the naturally occurring fraction of the plastic mixture but are not completely compostable. The synthetic polymer in these blends does not degrade. Lignin copolymers, in contrast, have the amazing property of being completely compostable. White rot Basidiomycete were able to compost 1-phenylethene graff copolymers of lignin containing different proportions of lignin and sidechain. The composting tests were run on products which contained 10.3, 32.2, and 50.4 weight percent of lignin, respectively. The polymer samples were incubated with white rot *Pleurotus ostreatus, Phanerochaete chrysosporium, Trametes versicolor,* and brown rot *Gleophyllum trabeum*. White rot fungi degraded both components of the plastic samples at a rate which increased with increasing lignin content in the copolymer sample. Observation by scanning electron microscopy of incubated copolymers showed a deterioration of the plastic surface. Brown rot fungus did not affect any of these plastics nor did any of the fungi degrade any of the pure poly(1-phenylethylene). White rot fungi in liquid media produced and secreted oxidative enzymes associated with lignin degradation during incubation with lignin-poly(1-phenylethylene) copolymer. The enzymes measured were lignin peroxidase, laccase, and Mn(II) peroxidase. The timing of enzyme production was the same for fungi cultivated on lignin and on copolymer, indicating that the two materials were equivalent substrates. Fourier transform, infrared spectra of the copolymers incubated with white rot fungi show decreases of intensity in the whole range of absorbances characteristic of both lignin and poly(1-phenylethylene), thus showing loss of both components from the thermoplastic. All of the fungi overgrew the tested lignin powder but mycelia of the white rot fungi produced capsular material outside the hyphae. The adhesion of microorganisms to surfaces is a decisive step in microbially induced corrosion. Presumably the active colonizers of polymer are able to adhere due to their ability to produce exocellular polymers composed primarily of nonionic and anionic polysaccharides. All tested white rot fungi demonstrated an ability to decrease the weight of both constituents of copolymer, no matter what ratio of the main components, poly(1-phenylethylene) and lignin, the plastic contained. This is shown in FIGS. 6A, 6B, 6C, and 6D. These white rot Basidiomycete caused a range of weight loss of copolymer that varied with the fungus with which the plastic was inoculated. The decomposing activity of *P. chrysosporium* and *T. versicolor* exceeded the activity of *P. ostreatus*. Decomposition of copolymer by brown rot *G. trabeum* and pure poly(1-phenylethylene) by all tested fungi was insignificant. The most efficient degradation of both constituents of copolymer by white rot fungi was observed with the plastics containing 50.4 and 32.2 weight percent lignin, respectively. There was a greater weight loss of poly(1-phenylethylene) from copolymer with a greater concentration of lignin. Note that measured weight loss of the copolymer components is due to their mineralization (conversion to $CO_2$ and $H_2O$) as well as their modification followed by ingestion by the fungal plant or partial solubilization in the surrounding medium.

This capacity to degrade is particularly important for applications of these new materials to the slow release of substituents into the environment. Research by Nelson (Nelson, L. L., Entomological Special Studies, No. 31-004-71, AD72034, No. 1-006-71, AD729343, No. 31-014-071, AD729344, 1970) clearly shows that non-degradable carriers for bioactive materials retain significant amounts of the biologically active agent long after effective release has ceased. This environmental contamination will not longer be allowed in most developed countries. As the new grafted product degrades, any compounds contained in the copolymer and portions of the sidechain and the backbone are released into the area around the degrading material, as well as into the organism performing the degradation. The above discussion of composting, now studied on copolymers made with different monomers, shows that modification, ingestion, and release all occur during graft degradation. These data show that the copolymers are matrix, controlled release materials. An formulation of copolymer reacted with or blended with a biologically active compound, BA, can be formed into an object which will be an erodible device for the release of BA. Further, the copolymer of this invention forms an novel and uniquely functional material for the formation of such a device. The grafted plant is a cellular material which contains voids that can retain a biologically active compound. These same backbone materials, the vascular plant or its structural constituents, have hydroxyl, carboxyl, aromatic, and alkene functional groups that can react with a precursor, B, of a biologically active molecule. Once B is chemically bound to the plant part, the sidechain composition and molecular weight can be chosen to insure solubility, suspendability, or durability of the new product in the desired controlled release application. Upon degradation, B—$R^1$ is released into the environment to affect an appropriate response from a target material or species. The adduct, —$R^1$, is a functional group added to B during the degradation of the formulation. The material released, BA or B—$R^1$, may be a biocide, herbicide, pesticide, growth stimulator or inhibitor, pH control agent, soil stabilizing agent, soil aerating agent, pheromone, repellent, or other biologically active agent. The adducts placed on B during degradation, —$R^1$, can be hydrogen, H; hydroxyl, O—H; carboxyl, $CO_2$; methyl, $CH_3$; methoxyl, O—$CH_3$; or ether, —O—. Hydroxyl and carboxyl groups are added routinely when esterase enzymes are active in the release of B. Methyl groups are often added by organisms to neutralize a toxin. Hydrogen, methoxyl, or ether groups are can be added by free radical recombination or by enzymatic action. It is important that the rate of release be zero order for many applications. A zero order rate is a release of a constant number of moles of biologically active agent in a given time. It is obtained by forming the formulated object as a high surface to volume piece, such as a flat sheet. The magnitude of the amount released in a given time, BA] or [B-$R^1$], can be controlled by the sidechain, the concentration of biologically active agent inside the formulated object and the environment in which the object is distributed, but the rate of release is controlled by shape more than anything else.

An example of such a controlled release material would be a grafted plant part designed to control floating weeds such as water hyacinth. This carrier of the herbicide should float to release the herbicide near the target species. The materials of this disclosure are novel in that any formulation with a volume fraction of plant, $VF_p$, that satisfies the equation $$VF_p * 0.4 + VF_s * \rho_s < 1.0 \qquad (6)$$

will float. Here, $VF_s$ is the volume fraction of sidechain, $\rho_s$ is the density of the sidechain, and $VF_p + VF_s = 1.00$. Because these copolymers have such a novel, low density, they can be formulated into materials which specifically deliver the herbicide, BA or B—$R^1$, to the desired target. Further, the sidechain can be designed to allow the backbone to degrade at a controlled rate by controlling the hydrophilic or hydrophobic nature of the surface of the erodible object formed from the copolmer-BA or B—$R^1$ product. A graft copolymer of a vascular plant and 2-oxo-3-oxypent-4-ene with a controlled degree of hydrolysis,

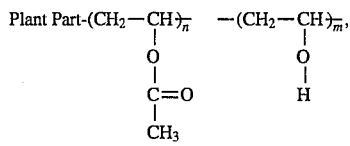

will allow the copolymer to degrade at a rate which increases as the ratio of m to n increases.

Materials made with a biochemically active side group, B, on the sidechain or materials made from a backbone to which a functional adduct, B, has been attached can release this group or adduct all during the degradation of the material. By polymerizing a monomer,

onto the plant part which can release B—$R^1$ as the degradation proceeds, a means is developed to produce, under natural conditions, a continuous and steady supply of B—$R^1$. Usual duration of release of the side group is 10 to 150 days with shorter and longer times possible by controlling "B" or "BA" concentration in the new product, lignin content of the product, molecular weight of the sidechain, and the monomer mixture in the sidechain. Thus, sidechains with 2-propenoic acid repeat units will tend to make the product more soluble and mobile in the environment and increase its rate of decay. Sidechains with 1-phenylethene, 2-propene nitrile, or 2-oxy-3-oxo- 4-methylpent-4-ene repeat units in them will make the new product more inert, slower to decay, and slower to release the adduct into the environment. These highly hydrophobic sidechains in high concentration and high molecular weight can slow the 10 to 150 day disintegration time to 1 to 2 years. The B groups are usually connected to the sidechain by carbon-carbon bonds while the B adducts are usually incorporated into the backbone by ester or ether linkages. Typical groups or adducts are acids, alcohols, alkanes, alkenes, alkoxides, amides, aromatics, cycloalkanes, esters, halogens, nitrile, and phenol groups and such groups further substituted with one or more groups.

The vascular plant material upon which grafting takes place can be any substance of which lignin is a part, with wood being the most common example. In view of the complex nature of wood and the number of compounds that can obstruct a free-radical reaction, it is amazing but now proven that this chemistry will graft contiguous wood as well as free, extracted lignin. The data of Table 16 show that the polymerization occurs when wood is used as the lignin-containing material but does not occur when cotton; a lignin-free, cellulose-based, plant product; is used in the reaction. Further, extraction of the reaction products with benzene for between 2 and 4.25 days shows that the wood has undergone a permanent, 50 to 375 weight percent gain in mass due to grafted sidechains being attached to the wood. These reactions were all stirred at a rate of 4 Hz. Further reactions have been run on parts of a number of vascular plants.

The reaction products of wood pulp and 1-phenylethene, and the reaction products of wood pulp and 4-methyl-2-oxy-3-oxopent-4-ene have been thermally compressed into thermoplastic composites which have good mechanical and thermal properties. The nature of the alteration of the plant is observed with reference to a plant part grafted with the monomer (4-bromophenyl)ethene [2039-82-9]. The bromine in this monomer allows the synthetic sidechain to absorb electrons far more intensely than the plant part. A thin section of an epoxy embedded plant shows that the surface of the plant part has been grafted with the bromine monomer in a reaction similar to that of sample 40-50-4, example 89, Table 16. The skin of the plant part, which has partially peeled off the plant, has a high concentration of bromine added by grafting. This is evident by both the darkness of the skin and a bromine map performed by the electron microscope. Photos were taken after benzene extraction of the product to remove homopolymer, so the coating is chemically bound. This bound plastic is the reason that composites and surface activity are possible with these new materials.

TABLE 16

Copolymerization Reactions of Wood Pulp and 1-Phenylethene.

| Sample Number | Reactants (g) | | | | Solvent | Yield (g)/(wt. %) | Type of Lignin - Containing Material |
|---|---|---|---|---|---|---|---|
| | 1-Phenyl ethene | Wood Material | $CaCl_2$ | $H_2O_2$ (mL) | | | |
| 40-14-5(82)[a] | 18.06 | 2.01 | 2.04 | 3.0 | 40.00 | 6.98/34.78 | RefineMech.Pulp |
| 40-26-5(83) | 11.37 | 2.02 | 2.03 | 3.0 | 50.04 | 11.33/84.62 | MechanicalPulp |
| 40-32-4(84) | 8.08 | 2.00 | 2.00 | 3.0 | 50.03 | 7.54/74.80 | ThermomechPulp |
| 40-34-3(85) | 6.04 | 2.03 | 2.01 | 3.0 | 50.07 | 6.15/76.21 | VeryHighYidSulf |
| 40-36-2(86) | 4.64 | 2.04 | 2.06 | 3.0 | 50.06 | 5.14/77.41 | ChemTherMePulp |
| 40-38-1(87) | 3.59 | 2.00 | 2.05 | 3.0 | 50.08 | 3.84/68.69 | GroundWoodPulp |
| 40-106-4(88) | 8.05[b] | 1.00 | 3.02 | 3.0 | 50.05 | 0.91/0.00 | Cotton |
| 40-50-4(89) | 11.78[c] | 2.02 | 2.05 | 3.0 | 50.02 | 12.73/92.25 | GroundWoodPulp |
| 40-50-5(90) | 18.05[d] | 2.00 | 2.02 | 3.0 | 50.10 | 18.09/90.22 | GroundWoodPulp |
| 40-95-3(91) | 14.04 | 6.01 | 3.00 | 3.0 | 30.01 | 19.84/98.95 | Oak Veneer |
| 40-94-3(92) | 14.03 | 6.00 | 3.01 | 3.0 | 30.02 | 13.25/66.15 | Maple Veneer |
| 40-127-3(93) | 18.02 | 2.01 | 3.02 | 3.0 | 50l03 | 18.31/91.41 | Used Lumber |

[a]Example Numbers in parentheses.

TABLE 16-continued

Copolymerization Reactions of Wood Pulp and 1-Phenylethene.

| Sample Number | Reactants (g) | | | | | Yield (g)/(wt. %) | Type of Lignin - Containing Material |
|---|---|---|---|---|---|---|---|
| | 1-Phenyl ethene | Wood Material | CaCl$_2$ | H$_2$O$_2$ (mL) | Solvent | | |

<sup>b</sup>This is the reaction on Degreased Cotton. Only cotton recovered.
<sup>c</sup>This sample was prepared using 1-(4-bromophenyl)ethene as the monomer.
<sup>d</sup>This sample was prepared using 1-(4-chlorophenyl)ethene as the monomer.

The structures of 1-(4-bromophenyl)ethene [2039-82-9] and 1-(4-chlorophenyl)ethene [27755-63-1] mentioned in the footnotes of the table on grafting of plant pulp are shown below.

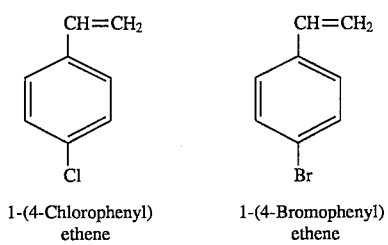

1-(4-Chlorophenyl)ethene    1-(4-Bromophenyl)ethene

The oak and maple hardwood veneer, examples 91 and 92, was grafted and then extracted for 48 hours with benzene. It showed a permanent weight gain and a hydrophobic surface, proving that the plastic was permanently bound to the wood. The used lumber used in example 93 was recovered from houses demolished in Boston and converted to wood filament with an aspect ratio of over 100. Aspect ratio is the ratio of an objects length to its diameter. Reactions with this wood ran very rapidly and gave a permanent 15 percent or more gain in weight. This material, with its plastic surface and high aspect ratio, would be a very good reinforcing fiber for a thermoplastic composite. The thermoplastic continuous phase would have to have a solubility parameter that was within 5 units of the solubility parameter of the plastic surface grafted to the wood.

These copolymers can be used to form any plastic or solid object by injection molding, blow molding, extrusion, vacuum forming, compression molding, transfer molding, or sheet casting. Compression molding of samples from Table VII containing up to 50 weight percent wood pulp gave uniform, opalescent thermoplastic sheets. A compression molding of mixtures of wood pulp and poly(1phenylethylene) under identical conditions gave clumped, heterogeneous sheets. Thus, this grafting process is necessary to produce useful, uniform thermoplastic solids. As the fraction of wood in the 2 phase solid increases, the tensile strength of the wood-plastic solid increases toward 175 MPa and the compressive strength changes toward 43 MPa. The compressive strength of the 2 phase solid will be between 5 and 150 megapascals.

A molecular weight would not used to describe a grafted piece of a vascular plant, since it contains several components that resist separation and measurement. A molecular weight can be calculated for reaction products made from the structural plant polymers, lignin, cellulose, and hemicellulose, that have been separated from the plant. The molecular weights of such copolymers are in the range of about 15,000 to about 30,000,000 as determined by size exclusion chromatography using known techniques. Under the process conditions of the present invention already described, it is possible to obtain molecular weights of about 1,000 to 300,000. Under these conditions, the polymer molecular weight is generally increased by increasing the ratio of moles of monomer to moles of hydroperoxide. The converse is true when diminishing the molecular weight. However, by utilizing another aspect of the present invention, it has now been found possible to greatly boost or increase the molecular weight of the growing polymer during polymerization by conducting the reaction essentially in a gelled state.

Generally, the gelled state can be formed by essentially repeating the procedures already described for synthesizing the graft copolymer, but by reducing the amount of dimethylsulfoxide (DMSO) solvent by a factor of 0.25 or more. In other words, instead of using about 30 mL of solvent for the reaction as described in the Examples, about 23 or less mL are used instead. It has been theorized that by conducting the polymerization reaction in the gelled state, the propagation reaction continues, while the termination reaction is greatly diminished. It is also possible that the higher concentration of backbone allows crosslinking in these lower solvent-content reactions. In general, the gelling occurs at room temperature with no heating being necessary. Reaction times are somewhat variable and on the order of from 1 to about 48 hours with reaction yields as high as 80 weight percent possible in about 10 hours.

Although the polymerization reaction of the present invention is a free-radical polymerization, the scope of the present invention clearly extends the concept of gel-state reactions to other types of polymerization reactions such as anionic or cationic chain polymerization or step polymerizations. These copolymers can be used to form any plastic or solid object by extrusion, blow molding, sheet casting, or injection molding.

Obviously, many modifications and variations of the present invention are possible in light of the above teachings. Therefore, within the scope of the appended claims, the present invention may be practiced otherwise than as specifically described.

We claim:
1. A composition, comprising:
   a) a first component containing a vascular plant or constituent thereof having at least 0.01 weight percent lignin, a cellulose content of 0 to 99.9 weight percent, a hemicellulose content of 0 to 90 weight percent, and a combined starch, lipid, crystal, silica bodies, silica stigmata, protein bodies, and mucilage content of 0 to 60 weight percent;
   b) a second component containing at least one thermoplastic having randomly repeating units R-formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-buta- diene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent- 4-ene; propene; and ethene; and c) a grafted layer which constitutes at least 10 percent of the area of contact between the first and second components wherein said grafted layer consists of a backbone of a vascular plant or constituent thereof grafted to a thermoplastic sidechain, said backbone of a vascular plant or constituent thereof having at least 0.01 weight percent lignin, a cellulose content of 0 to 99.9 weight percent, a hemicellulose content of 0 to 90 weight percent, and a combined starch, lipid, crystal, silica bodies, silica stigmata, protein bodies, and mucilage content of 0 to 60 weight percent; said at least one thermoplastic sidechain having randomly repeating units R- formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-butadiene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent- 4-ene; propene; and ethene; such that the number of sidechains grafted to the vascular plant or constituent thereof varies from 1 to 500 and the number of repeat units in each sidechain varies from 1 to 500,000.

2. The composition according to claim 1, wherein the vascular plant or constituent thereof constitutes one or more of lignin, wood, wood pulp, wood fiber, wood filament, wood veneer, xylem, bark, twigs, roots, shoots, leaves, seeds, phloem, cambium, parenchyma, collenchyma, sclerenchyma cells, and structured plant parts from any grass, softwood, and hardwood.

3. The composition according to claim 1 wherein the grafted layer is a macromolecular surfactant that wets the first component to form thereon a smooth, adherent surface coating which changes the contact angle of water from water wet, less than 90°, to oil wet, greater than 90°.

4. The composition according to claim 4 having at least first and second phases, the first phase having a maximum dimension in one plane which is less than 100 microns and being essentially uniformly distributed in the second phase, the first phase being rich in the first component or the second component, and the second phase being rich in the other component.

5. The composition according to claim 4, wherein the first phase contains shapes which are generally spherical, cylindrical, or planar.

6. A composition having a tensile strength or a compression strength of at least 5 MPa and which is ductile and moldable, comprising:

a) a first component containing a vascular plant or constituent thereof having at least 0.01 weight percent lignin, a cellulose content of 0 to 99.9 weight percent, a hemicellulose content of 0 to 90 weight percent, and a combined starch, lipid, crystal, silica bodies, silica stigmata, protein bodies, and mucilage content of 0 to 60 weight percent;

b) a second component containing at least one thermoplastic having randomly repeating units R-formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-butadiene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent- 4-ene; propene; and ethene; and c) a grafted layer which constitutes at least 10 percent of the area of contact between the first and second components wherein said grafted layer consists of a backbone of a vascular plant or constituent thereof grafted to a thermoplastic sidechain, said backbone of a vascular plant or constituent thereof having at least 0.01 weight percent lignin, a cellulose content of 0 to 99.9 weight percent, a hemicellulose content of 0 to 90 weight percent, and a combined starch, lipid, crystal, silica bodies, silica stigmata, protein bodies, and mucilage content of 0 to 60 weight percent; said at least one thermoplastic sidechain having randomly repeating units R- formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n= 2, 3, or 4; 1,3-butadiene; 2-methyl-1,3-butadiene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent- 4-ene; propene; and ethene; such that the number of sidechains grafted to the vascular plant or constituent thereof varies from 1 to 500 and the number of repeat units in each sidechain varies from 1 to 500,000.

7. A composition comprising a biologically active compound, BA, and a multicomponent material comprising:

a) a first component containing a vascular plant or constituent thereof having at least 0.01 weight percent lignin, a cellulose content of 0 to 99.9 weight percent, a hemicellulose content of 0 to 90 weight percent, and a combined starch, lipid, crystal, silica bodies, silica stigmata, protein bodies, and mucilage content of 0 to 60 weight percent;

b) a second component containing at least one thermoplastic having randomly repeating units R formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-butadiene; 2-propene nitrile; 1,1-dichloroethene; 2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent-4-ene; propene; and ethene; and c) a grafted layer which constitutes at least 10 percent of the area of contact between the first and second components wherein said grafted layer consists of a backbone of a vascular plant or constituent thereof grafted to a thermoplastic sidechain, said backbone of a vascular plant or constituent thereof having at least 0.01 weight percent lignin, a cellulose content of 0 to 99.9 weight percent, a hemicellulose content of 0 to 90 weight percent, and a combined starch, lipid, crystal, silica bodies, silica stigmata, protein bodies, and mucilage content of 0 to 60 weight percent; said at least one thermoplastic sidechain having randomly repeating units R- formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3- butadiene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent-4-ene; propene; and ethene; such that the number of sidechains grafted to the vascular plant or constituent thereof varies from 1 to 500 and the number of repeat units in each sidechain varies from 1 to 500,000, the composition characterized by its erosion under normal conditions in the environment to release BA at a controlled rate.

8. A composition of claim 7 wherein BA is selected from the group consisting of biocide, herbicide, pesticide, growth stimulator, growth inhibitor, pH control agent, soil stabilizing agent, soil aerating agent, pheromone, or repellent.

9. The composition according to claim 1, wherein the grafted layer further includes a component B in the backbone or in the sidechain, where B is selected to provide a degradation product B—$R^1$, where $R^1$ is hydrogen; H; hydroxyl, O—H; carboxyl, $CO_2$; methyl, $CH_3$; methoxyl, O—$CH_3$; or ether, —O—.

10. The composition according to claim 9, wherein B is one or more precursors of constituents applied to plants and forms B—$R^1$ upon degradation such that B—$R^1$ is selected from the group consisting of biocide, herbicide, pesticide, growth stimulator or inhibitor, pH control agent, soil stabilizing agent, soil aerating agent, pheromone, or repellent.

11. A composition having a gas phase and a solid phase; the solid phase being at least in part constituted by a composition comprising:

a) a vascular plant or constituent thereof, b) at least one thermoplastic having randomly repeating units R- formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-butadiene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent- 4-ene; propene; and ethene; and c) a grafter layer which constitutes at least 10 percent of the area of contact between the vascular plant and thermoplastic wherein said grafted layer consists of a backbone of a vascular plant or constituent thereof having at least 0.01 weight percent lignin, a cellulose content of 0 to 99.9 weight percent, a hemicellulose content of 0 to 90 weight percent, and a combined starch, lipid, crystal, silica bodies, silica stigmata, protein bodies, and mucilage content of 0 to 60 weight percent; bonded to at least one thermoplastic sidechain having randomly repeating units R- formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-butadiene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent-4-ene; propene; and ethene; such that the number of sidechains grafted to the vascular plant or constituent thereof varies from 1 to 500 and the number of repeat units in each sidechain varies from 1 to 500,000;

and the gas phase is constituted by a plurality of cells containing a gas.

12. The composition according to claim 11, wherein the solid phase further comprises plastic or polymers.

13. The composition according to claim 11, wherein the solid phase further comprises additives to facilitate formation of gas-solid foam products such additives selected from the group consisting of fillers, extenders, nucleating agents, stabilizers, crosslinkers, and conditioning agents.

14. The composition according to claim 11, wherein the solid phase is essentially continuous.

15. The composition according to claim 11, wherein the gas is air or a blowing agent selected from the group consisting of isomeric pentanes and hexanes, halocarbons, $C_1$ to $C_8$ hydrocarbons, air, carbon dioxide, water, nitrogen, noble gases, and gaseous reaction products of sodium citrate-sodium-hydrogen carbonate or water-isocyante.

16. The composition according to claim 11, wherein the gas constitutes up to 25% by weight of the gas-solid composition.

17. A composition having a gas phase and a solid phase comprising a backbone and at least one sidechain, and characterized by degradation of the backbone and the sidechain when the gas-solid composition is exposed to soil, air and moisture; the solid phase being in part constituted by a composition comprising:

a) a vascular plant or constituent thereof;

b) at least one thermoplastic having randomly repeating units R- formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-butadiene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent- 4-ene; propene; and ethene; and c) a grafted layer which constitutes at least 10 percent of the area of contact between the vascular plant and the thermoplastic wherein said grafter layer consists of a backbone of a vascular plant or constituent thereof having at least 0.01 weight percent lignin, a cellulose content of 0 to 99.9 weight percent, a hemicellulose content of 0 to 90 weight percent, and a combined starch, lipid, crystal, silica bodies, silica stigmata, protein bodies, and mucilage content of 0 to 60 weight percent; bonded to at least one thermoplastic sidechain having randomly repeating units R- formed by the polymerization of at least one selected from the group consisting of 1-chloroethene; 1,1,2,2-tetrafluoroethene; 1-phenylethene; 1-(4-bromophenyl)ethene; 1-(4-chlorophenyl)ethene; 1,n-diethenylbenzene, where n=2, 3, or 4; 1,3-butadiene; 2-methyl-1,3-butadiene; 2-propene nitrile; 1,1-dichloroethene; 1,2-dichloroethene; 1-methyl-1-phenylethene; 2-chloro-1,3-butadiene; 2-oxo-3-oxypent-4-ene; 2-oxy-3-oxopent-4-ene; 4-methyl-2-oxy-3-oxopent-4-ene; propene; and ethene; such that the number of sidechains grafted to the vascular plant or constituent thereof varies from 1 to 500 and the number of repeat units in each sidechain varies from 1 to 500,000;

and the gas phase is constituted by a plurality of cells containing a gas.

18. The composition according to claim 1 wherein the thermoplastic sidechain of the grafted layer and the thermoplastic of the second component each have a solubility parameter (S) defined as the square root of the quantity: heat of vaporization (E) divided by molar volume (V), and expressed as $S=(E/V)^{0.5}$ where for the thermoplastic sidechain of the grafted layer and $S_s$ for the second component differ by no more than 5.

19. The grafted composition according to claim 18 wherein the absolute value of the difference, $S_f$ minus $S_s$, is not greater than 2.

* * * * *